(12) United States Patent
Nada et al.

(10) Patent No.: US 7,909,546 B2
(45) Date of Patent: Mar. 22, 2011

(54) THREAD CUTTING INSERT

(75) Inventors: Yutaka Nada, Shimotsuma (JP); Osamu Ichinoseki, Joso (JP)

(73) Assignee: Mitsubishi Materials Corporation, Tokyo (JP)

( * ) Notice: Subject to any disclaimer, the term of this patent is extended or adjusted under 35 U.S.C. 154(b) by 291 days.

(21) Appl. No.: 11/863,565

(22) Filed: Sep. 28, 2007

(65) Prior Publication Data
US 2008/0226404 A1 Sep. 18, 2008

(30) Foreign Application Priority Data

Mar. 12, 2007 (JP) ................. 2007-061464

(51) Int. Cl.
B23P 15/36 (2006.01)
(52) U.S. Cl. ...................... 407/114; 407/113
(58) Field of Classification Search ............. 407/13, 407/114, 115, 116
See application file for complete search history.

(56) References Cited

U.S. PATENT DOCUMENTS

| | | | | |
|---|---|---|---|---|
| 3,707,747 A * | 1/1973 | Falk | ............................. | 407/114 |
| 4,281,430 A * | 8/1981 | Hellnick | ....................... | 408/188 |
| 4,359,300 A * | 11/1982 | Hazra et al. | .................... | 407/114 |
| 4,360,297 A * | 11/1982 | Weber | ........................... | 407/113 |
| 4,552,492 A * | 11/1985 | Komanduri et al. | .......... | 407/114 |
| 4,575,888 A * | 3/1986 | Muren | ........................... | 470/80 |
| 4,669,925 A * | 6/1987 | Lowe et al. | .................... | 407/114 |
| 4,954,021 A * | 9/1990 | Tsujimura et al. | .............. | 407/35 |
| 4,966,500 A * | 10/1990 | Tsujimura et al. | .............. | 407/34 |
| 4,993,892 A * | 2/1991 | Takahashi | ..................... | 407/114 |
| 5,122,017 A * | 6/1992 | Niebauer | ....................... | 407/114 |
| 5,451,122 A * | 9/1995 | Noda et al. | ..................... | 409/137 |
| 5,456,557 A * | 10/1995 | Bernadic et al. | .............. | 407/114 |
| 5,476,346 A * | 12/1995 | Lundstrom | .................... | 407/114 |
| 5,505,569 A * | 4/1996 | Gustafsson et al. | .......... | 407/113 |
| 5,549,425 A * | 8/1996 | Bernadic et al. | .............. | 407/114 |
| 5,634,745 A * | 6/1997 | Wiman et al. | ................. | 407/113 |
| 5,765,972 A * | 6/1998 | Ericksson et al. | ............. | 407/114 |
| 5,964,552 A * | 10/1999 | Larsen | .......................... | 407/113 |
| 6,138,540 A * | 10/2000 | Niemi | ........................... | 82/1.11 |
| 6,293,738 B1 * | 9/2001 | Hartlohner et al. | ........... | 407/114 |
| 6,543,970 B1 * | 4/2003 | Qvarth et al. | ................. | 407/114 |
| 6,632,051 B1 * | 10/2003 | Wermeister | .................... | 407/114 |
| 7,241,083 B2 * | 7/2007 | Nada et al. | .................... | 407/114 |
| 7,611,310 B2 * | 11/2009 | Isaksson | ......................... | 407/11 |
| 2004/0109733 A1 * | 6/2004 | Fouquer | ........................ | 407/113 |

FOREIGN PATENT DOCUMENTS

| | | | |
|---|---|---|---|
| EP | 567899 A1 * | 11/1993 | |
| EP | 577573 A1 * | 1/1994 | |
| EP | 703032 A1 * | 3/1996 | |
| EP | 857531 A1 * | 8/1998 | |
| GB | 2254026 A * | 9/1992 | |
| JP | 05177415 A * | 7/1993 | |
| JP | 08071832 A * | 3/1996 | |
| JP | 08-257837 | 10/1996 | |

(Continued)

*Primary Examiner* — Jason Daniel Prone
*Assistant Examiner* — Jennifer Swinney
(74) *Attorney, Agent, or Firm* — Leason Ellis LLP.

(57) ABSTRACT

In this thread cutting insert, on a common edge section of front and back faces of an insert main body, there is formed a pair of cutting edge sections that project from the edge section when seen from a direction facing the front and back faces, and on at least two of four projecting faces that respectively face the front and back face sides of the pair of these cutting edge sections, there is formed a thread cutting edge with the projecting face serving as a rake face.

14 Claims, 16 Drawing Sheets

FOREIGN PATENT DOCUMENTS

| | | |
|---|---|---|
| JP | 08-294804 | 11/1996 |
| JP | 09-502396 | 3/1997 |
| JP | 11-000805 | 1/1999 |
| JP | 11-514939 | 12/1999 |
| JP | 2001-514089 A | 9/2001 |
| JP | 2004-291104 | 10/2004 |
| JP | 2006-082168 | 3/2006 |
| JP | 2006-123041 | 5/2006 |
| JP | 2007105819 A * | 4/2007 |
| WO | 95/07159 A1 | 3/1995 |
| WO | WO 9507159 A1 * | 3/1995 |

* cited by examiner

THREAD CUTTING INSERT

BACKGROUND OF THE INVENTION

Priority is claimed on Japanese Patent Application No. 2007-61464, the contents of which are incorporated herein by reference.

1. Field of the Invention

The present invention relates to a thread cutting insert that is held on a tool main body of a detachable insert type cutting tool, for performing thread cutting on a workpiece.

2. Description of Related Art

As this type of thread cutting insert, in the following Patent Documents 1 to 4 for example, there have been proposed various kinds of thread cutting inserts in which, in each corner section of a triangular face of a triangular flat plate shaped insert main body, there is formed a cutting edge section that forms a convex V shape when seen from the direction facing the triangular face, and the convex V shape face of this cutting edge section serves as a rake face, on the side ridgelines of which there are formed a pair of thread cutting edges that form a convex V shape corresponding to the cross-sectional shape of the thread to be cut. Also, the inventors of the present invention proposed to achieve an improvement in chip processing with such a thread cutting insert disclosed in Patent Document 5 below.

(1) Patent Document 1: Japanese Unexamined Patent Application, First Publication No. H08-257837

(2) Patent Document 2: Japanese Unexamined Patent Application, First Publication No. H08-294804

(3) Patent Document 3: Published Japanese Translation No. H09-502396 of PCT International Publication (4) Patent Document 4: Published Japanese Translation No. 2001-514089 of PCT International Publication (5) Patent Document 5: Japanese Unexamined Patent Application, First Publication No. 2006-123041

However, in the conventional thread cutting inserts disclosed in these Patent Documents 1 to 5, even with a negative type insert, the flank face of which extends in parallel with the thickness direction of the insert main body, the thread cutting edge is formed only on a convex V shape face of a cutting edge section on the side of one of a pair of front-back triangular faces of the triangular flat plate shaped insert main body. Accordingly, with a generic negative type flat plate shaped insert, while a cutting edge formed in a corner section that is common for both of the front and back faces can be used, the number of corner sections that are available for use becomes half. As a result, in this type of thread cutting insert in which the portion to be used as a cutting edge is already small enough, even if the insert main body is formed from a super hard alloy or the like, effective use of the insert main body is hardly achieved.

The present invention takes the above circumstances into consideration, and its object is to provide an economical thread cutting insert that increases the number of thread cutting edges that are available for use with a single insert main body to achieve effective use of the insert main body.

SUMMARY OF THE INVENTION

In order to solve the above problems, the present invention employs the followings.

That is to say, the present invention employs a thread cutting insert in which on a common edge section of front and back faces of an insert main body, there is formed a pair of cutting edge sections that project from the edge section when seen from a direction facing the front and back faces, and on at least two of four projecting faces that respectively face the front and back face sides of the pair of the cutting edge sections, there is formed a thread cutting edge on a side ridgeline of a rake face where the projecting face serves as the rake face.

Therefore, in such a thread cutting insert, the thread cutting edges are formed on the side ridgelines of at least two of the projecting faces among the total of four of the projecting faces of the pair of the cutting edge sections formed on the common edge section of the front and back faces of the insert main body. As a result, even in the case where the insert main body is of a polygonal flat plate shape such as the above mentioned triangular flat plate shape and the front and back faces are polygonal faces having the above edge sections as corner sections, one corner section enables use of the thread cutting edge at least twice, and the number of the thread cutting edges that are available for use with a single insert main body can be increased. In particular, if the above pair of the cutting edge sections are formed such that the side ridgelines of the two projecting faces are symmetric about the center line of the edge section that passes between these projecting faces when seen from the direction facing the front and back faces, then it becomes possible to have the shape of the thread cutting edges with these projecting faces serving as rake faces or the shape of the thread cutting edges with the projecting faces on the front and back faces side serving as rake faces, made the same to be used.

Incidentally, in the above conventional thread cutting insert, the thread cutting edge is formed only on one triangular face side. This is because, in such a thread cutting insert, for example, when forming a female thread section on the inner circumference of a blind hole formed on a workpiece towards the hole bottom side, even in the case where a vertical wall of the hole bottom face is present on the insert feeding direction side, in order to perform thread cutting to the possible closest vicinity of this vertical wall, the convex V shaped cutting edge section is formed so that the bisector thereof is, when seen from the direction facing the triangular face, parallel with one of the pair of the side ridgelines of the triangular face that extend in the directions intersecting in the corner section where this cutting edge section is formed, and because the insert main body is configured to be held on the tool main body where one of the side ridgelines of the triangular face and the bisector are perpendicular to the feeding direction.

That is to say, such a thread cutting insert becomes a so called one side oriented insert. Therefore even if a thread cutting edge is formed on the convex V shape face cutting edge section on the other triangular face side and the insert main body is reversed where the bisector of this convex V shape face is perpendicular to the feeding direction, in order to perform thread cutting with the thread cutting edge on the other triangular face side, the corner section positioned on the opposite side of one side ridgeline of the triangular face projects to the feeding direction side, thereby disabling thread cutting to the possible closest vicinity of the vertical wall mentioned above.

Moreover, if the insert main body is reversed so that the bisector of the convex V shape face on the other triangular face side is perpendicular to the feeding direction, it simply cannot be attached to the tool main body of the original detachable insert type cutting tool. As a result, two types of tool main bodies will be needed. For example, this is similar to the case of preparing a tool main body with a different side orientation where in such a one side oriented thread cutting insert, thread cutting edges are pre-formed on the convex V shape face of both of the front and back triangular face sides in the cutting edge section, and when the insert main body is reversed, the detachable insert type cutting tool becomes an inversed mirror image of the original tool. Accordingly, there will be an increase in cost, the management of inserts and the tool main bodies becomes troublesome, and there is a possibility that inserts having different side-orientations may be incorrectly attached to the tool main bodies.

In order to solve such problems, even when forming thread cutting edges on at least two of four of the projecting faces of the pair of the cutting edge sections, it is preferable to form a thread cutting edge with the projecting face serving as a rake face on the two projecting faces formed by the alternately positioned cutting edge sections respectively on the front and back face sides.

In the thread cutting insert of such a configuration, even when the insert main body is reversed back to front, the two projecting faces positioned on the alternately positioned cutting edge sections on the front and back face sides among the respective front and back projecting faces in the pair of the cutting edge sections is always positioned on the same side of the pair of the cutting edge sections when seen from the direction facing the face positioned on the front side among the front and back faces, for example. As a result, by forming thread cutting edges on the side ridgelines where such alternate projecting faces serve as rake faces, then when the insert main body is reversed back to front, the side orientation of the thread cutting edge of these alternate projecting faces stays the same.

Therefore, by reversing the insert main body back to front, according to the thread cutting insert of the above configuration, the thread cutting edges formed on both of the front and back face sides on the above common edge sections can be used. Moreover, if the insert main body is formed so as to be front-back inverse symmetric, then it can be directly re-attached to the original tool main body. Furthermore even in the case where the insert main body is of a polygonal flat plate shape, the pair of the side ridgelines of the polygonal faces that extend in the direction of intersecting in the corner section can be arranged in the same positions when reversed back to front. As a result, even if a vertical wall mentioned above is present, it is possible to perform thread cutting to the possible closest vicinity of the vertical wall.

In the case of forming thread cutting edges with the projecting faces serving as rake faces on the two projecting faces formed by the cutting edge sections alternated on the front and back face sides in this way, if the thread cutting edges are formed only on these two projecting faces, and are used with the side orientation of the thread cutting edges made the same by reversing the insert main body back to front as mentioned above, two of the projecting faces other than the two projecting faces, which serve as the rake faces and on which these thread cutting edges are formed, are never directly involved in thread cutting. However, if chip breakers are formed on these other projecting faces, it becomes possible to smoothly process chips that have been created by the thread cutting edge and have been discharged to the other projecting face side, by dividing the chips or controlling the discharging direction of the chips using the chip breakers.

On the other hand, in the case where the thread cutting edges are formed in this way on the two projecting faces formed by the alternated cutting edge sections on the front and back face sides where the projecting faces serve as the rake faces, thread cutting edges may be similarly formed on the other two projecting faces. That is to say, in the above pair of the cutting edge sections, the thread cutting edges may be formed on all of the four projecting faces that respectively face the front and back face side where the projecting faces serve as the rake faces. In this case, the thread cutting edges on the aforementioned two projecting faces and the thread cutting edges on the other two projecting faces have different side orientations. However, it becomes possible to utilize all of the four projecting faces on both of the front and back face sides of the pair of the cutting edge sections as the rake faces of the thread cutting edges.

Although the side orientation will be different, only two projecting faces of either the front face side or the back face side of the pair of the cutting edge sections may be made the rake faces, or only two projecting faces on the front and back face sides of one cutting edge section may be made the rake faces, to form thread cutting edges on their side ridgelines. Furthermore, any three projecting faces of the four projecting faces that face the front and back face sides of the pair of the cutting edge sections may be made the rake faces to form the thread cutting edges on the side ridgelines of the rake faces.

Moreover, including the case of forming chip breakers on the other two projecting faces as mentioned above, a plurality of projecting chip breakers may be formed in the pair of the cutting edge sections, and thereby it becomes possible to more smoothly process chips created by the thread cutting edges. Furthermore if one of the plurality of these chip breakers is extended between the pair of the side ridgelines of the above polygonal face that extend in the directions intersecting in the corner section, the chips that may be discharged in any direction can be reliably processed.

On the other hand, the rake face may be a positive rake face that gradually recedes from the side ridgeline of the rake face towards the inside, and thereby it becomes possible to improve the cutting performance of the thread cutting edge while reducing cutting resistance. Moreover if this positive rake face is formed so as to recede in steps, chips can be curled on the bent section of each step, thereby enabling promotion of more reliable chip processing.

Furthermore, particularly in the case where the thread cutting edges are formed on all of the four projecting faces as mentioned above, it may be difficult to determine which thread cutting edge of the projecting face is unused or used. Therefore, it is preferable that an index that indicates either one of the pair of the cutting edge sections be provided in the vicinity of the edge section of the insert main body.

However, when forming the thread cutting edge on any of the projecting faces, respectively on the front and back face sides of the pair of the cutting edge sections, the projecting face other than those projecting faces on which the thread cutting edges, which actually cut into a workpiece during the thread cutting process, are formed, and the other cutting edge section on which this other projecting face is formed are not to be directly used in thread cutting, and it is preferable that they be provided so as not to interfere with; the surface of the workpiece onto which thread cutting is performed, the thread section formed on the workpiece by the thread cutting edge of the one cutting edge section, or the above mentioned vertical wall. This applies to the edge sections of the insert main body other than the edge sections on which the cutting edge sections are formed.

Therefore, firstly, in the case where the insert main body is of a polygonal flat plate shape, that is to say, the front and back faces are of polygonal faces having the edge sections as the corner sections, and a vertical wall is present on the insert feeding direction side in the workpiece as mentioned above, in order to prevent interference between this vertical wall and the other edge section of the insert main body and to enable thread cutting to the closest possible vicinity of this vertical wall, then when seen from the direction facing the front and back faces, it is preferable that the center line that extends to the projecting end of the projecting face formed by the one cutting edge section be parallel with the side ridgeline, that is positioned on the other side of the other cutting edge section opposite to the one cutting edge section, among the pair of the side ridgelines of the polygonal face that extend in the directions intersecting in the corner section. Thereby, when performing thread cutting where the center line of the projecting face of the one cutting edge section is perpendicular to the insert feeding direction, it is possible to perform thread cutting, while the side ridgeline of the polygonal face of the insert main body to be positioned on this insert feeding direction side is also perpendicular to the insert feeding direction, until the other edge section (side face) of the insert main body that continues to this side ridgeline reaches immediately before the vertical wall.

Moreover, in the case where the insert main body is similarly of a polygonal flat plate shape and the front and back faces are of polygonal faces having the edge sections as the corner sections, in order to prevent interference between the above mentioned vertical wall and the other projecting face or the other cutting edge section, then when seen from the direction facing the front and back faces, it is preferable that the pair of the cutting edge sections be formed so as to not go beyond the extended line of the pair of the side ridgelines of the polygonal face that extend in the directions intersecting in the corner section. Thereby, even if the side ridgeline of the insert main body on the insert feeding direction side is made perpendicular to this feeding direction as mentioned above for example, the other cutting edge section or the other projecting face do not project towards the feeding direction side beyond this side ridgeline, and therefore their interference with the vertical wall can be avoided.

On the other hand, in order to prevent interference between the thread section formed on a workpiece or on the surface of the workpiece on which thread cutting is performed, then when seen from the direction facing the front and back faces, it is preferable that the pair of the cutting edge sections be formed so that the side ridgeline on the one cutting edge section side of the projecting face formed by the other cutting edge section is perpendicular to the center line that extends towards the projecting end of the projecting face formed by the one cutting edge section, or so that it extends at an incline so as to recede in the center line direction as it goes away from the one cutting edge section. Thereby, even in the case where the pair of the side ridgelines on the one cutting edge section side of this other cutting edge section is perpendicular to the center line of the one cutting edge section, thread cutting can be performed by having the thread cutting edge of the one cutting edge section cut in the center line direction, without having interference between the other cutting edge section or the other projecting face and the workpiece at least to the position of the pair of the side ridgelines of this other cutting edge section.

Moreover, in such a thread cutting insert, a flat drag is provided on the base end side of the thread cutting edge in order to make the top section of the formed thread smooth in some cases. However, in the case where such a flat drag is applied to the thread cutting insert to form the thread cutting edge with the projecting face formed by the one cutting edge section serving as the rake face, and the flat drag that continues to the base end side of this thread cutting edge, on the pair of the cutting edge sections when seen from the direction facing the front and back faces, then in order to avoid their interference with the thread section, the other cutting edge section needs to be formed so as to recede from the flat drag in the center line direction extending towards the projecting end of the projecting face formed by the one cutting edge section. Thereby, interference of the other cutting edge section with the smooth top section of the thread finished by the flat drag in this way can also be reliably prevented.

If the projecting face is of a convex V shape, a trapezoidal shape, or a protruding arc shape, the width of which becomes narrower towards its projecting side when seen from the direction facing the front and back faces, then it respectively becomes able to form a triangular thread, a trapezoidal thread, or a round thread on a workpiece.

As described above, according to the present invention, the number of thread cutting edges that can be used in one insert main body can be increased, and effective use of the insert main body can be achieved while enabling economical thread cutting processing.

BRIEF DESCRIPTION OF THE DRAWINGS

FIG. 12 is an enlarged plan view of the corner section 4 of the insert main body 1 in FIG. 11.

DETAILED DESCRIPTION OF THE INVENTION

Figure 1:
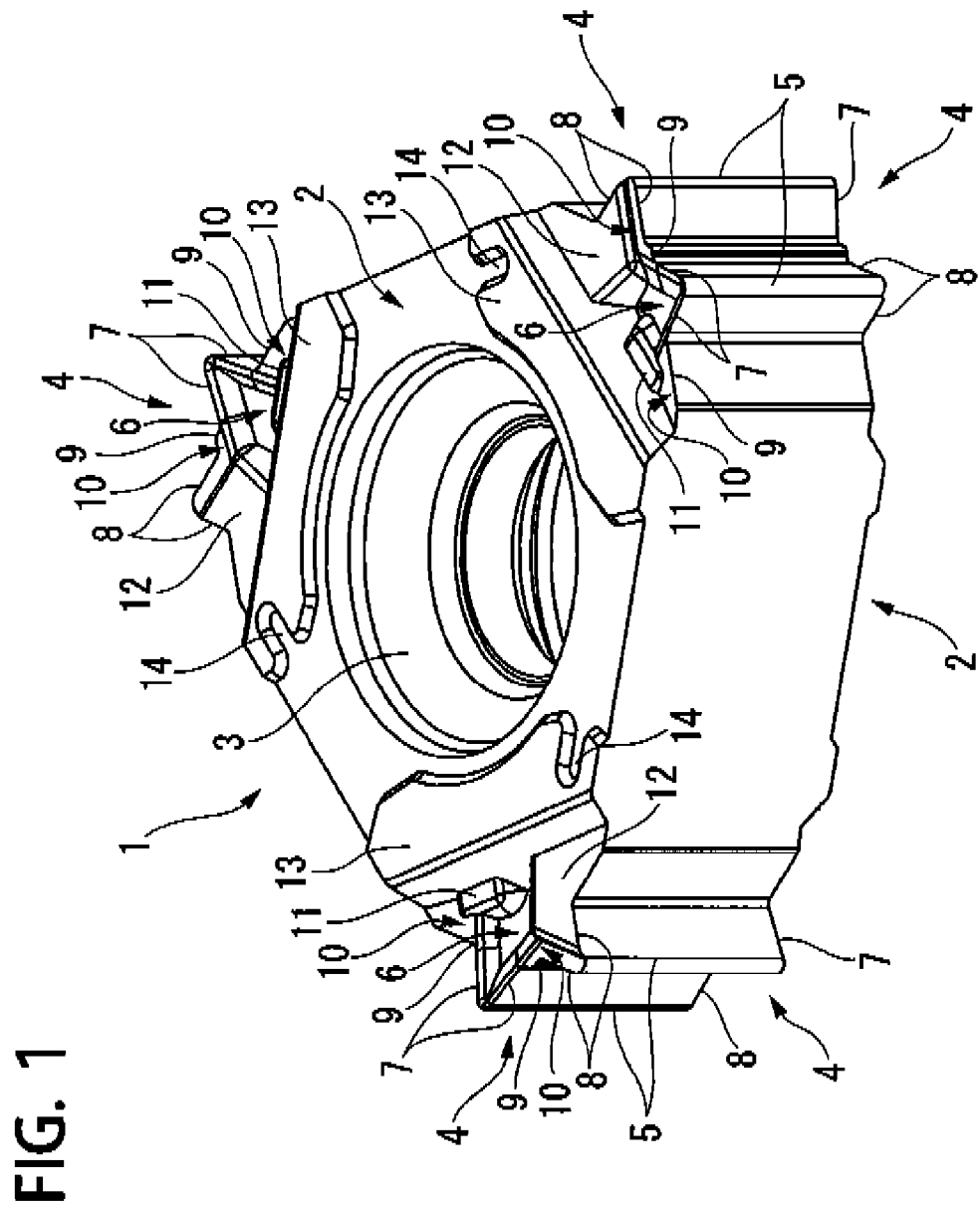
FIG. 1 is a perspective view showing a first embodiment of the present invention.
Figure 2:
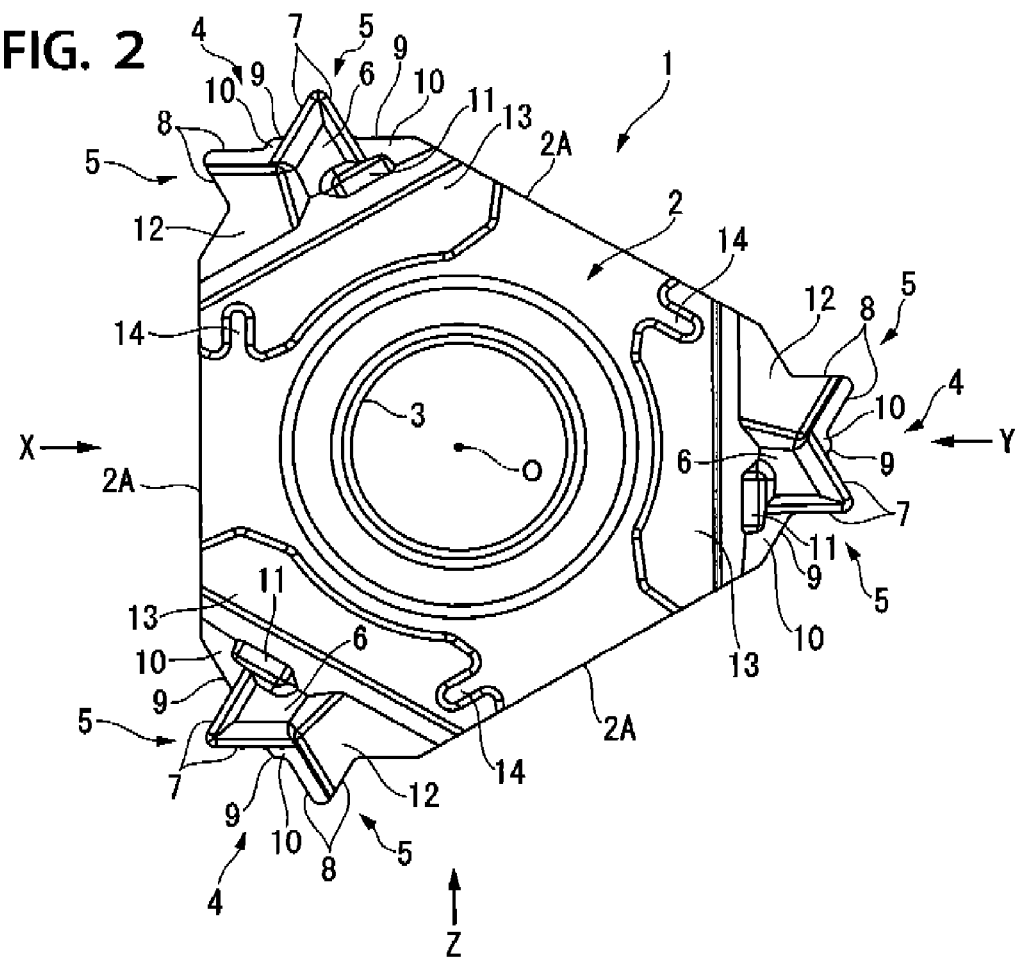
FIG. 2 is a plan view of the embodiment shown in FIG. 1 seen from a direction facing an equilateral triangular face 2 along an axis O.

FIG. 1 through FIG. 9 show a first embodiment of the present invention for a case of forming a triangular thread in a workpiece. In the present embodiment, an insert main body 1 is formed from a hard material such as a super hard alloy, in a substantially equilateral triangular flat plate shape as shown in FIG. 2, and in the center of a pair of equilateral triangular faces 2 that form the front and back faces of the insert main body 1, there is opened a cross-sectionally round attachment hole 3 that passes through the insert main body 1 in the thickness direction thereof (vertical direction in FIG. 1, FIG. 3 to FIG. 5, FIG. 7 to FIG. 10). The insert main body 1 is 120° rotationally symmetric about an axis O that passes through the center of the attachment hole 3 as shown in FIG. 2.

Moreover, the insert main body 1, for each of three corner sections 4 which are common edge sections of the equilateral triangular face 2 where three side ridgelines intersect with each other, is also 180° rotationally symmetric about three axes that pass through the thickness direction center of the insert in parallel with bisectors L of these corner sections 4 which are center lines of the edge sections. That is to say, the insert main body 1 is of a front-back inverted symmetric shape when the equilateral triangular faces 2 of the front and back sides are inverted. Furthermore, side faces of the insert main body 1 that are arranged around the periphery of these equilateral triangular faces 2 are formed so as to extend in parallel with the thickness direction of the insert, and on these side faces there is formed a flank face of a thread cutting edge described later. That is to say, the thread cutting insert of the present embodiment is a negative type insert where the flank face thereof does not have a flank angle.

Figure 6:
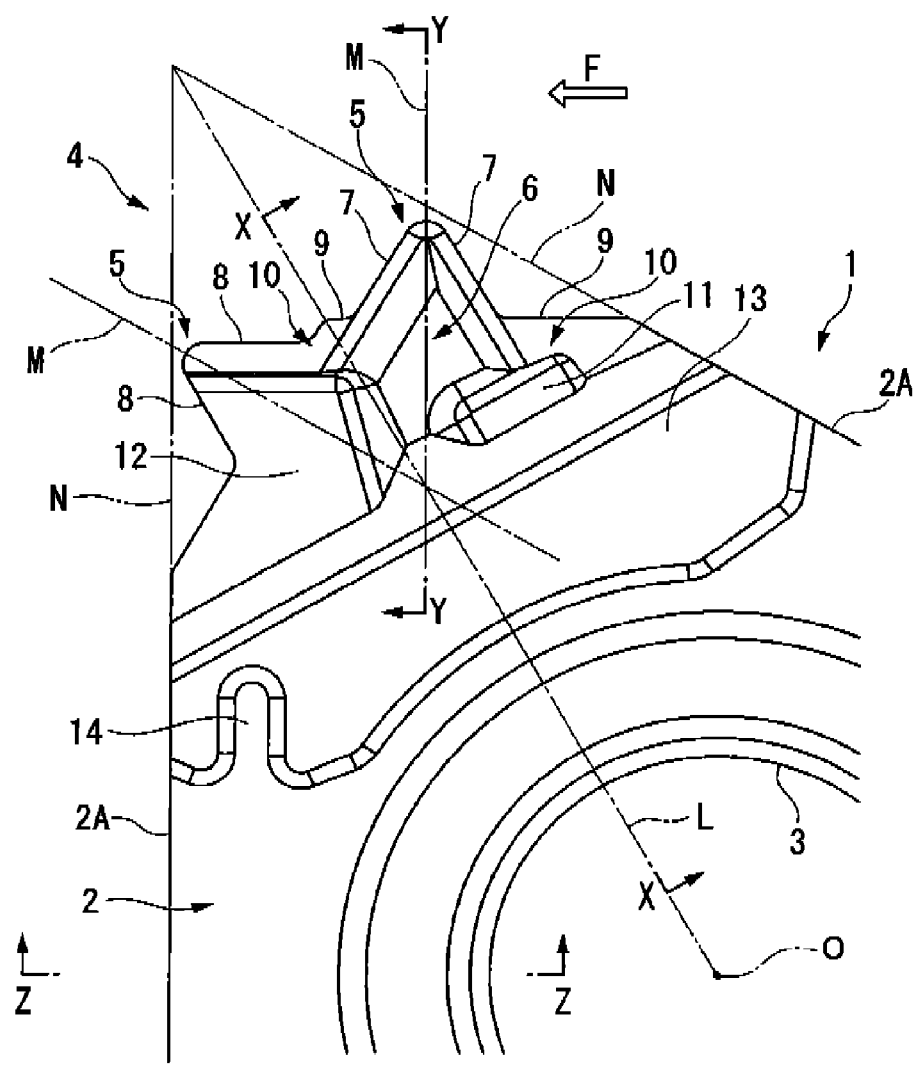
FIG. 6 is an enlarged plan view of a corner section 4 of an insert main body 1 in FIG. 2.

On the respective corner sections 4 of the equilateral triangular faces 2 of such an insert main body 1, there is formed a pair of cutting edge sections 5 that project in a convex V shape towards the outside of the equilateral triangular faces 2 as shown in the plan view of FIG. 6 seen from the direction facing these equilateral triangular faces 2 along the center line O. These cutting edge sections 5 are formed such that their outline shape is symmetric about the bisector L of the corner section 4 in the plan view. Moreover, bisectors M of the convex V shape of these cutting edge sections 5, that is, the center lines of projecting faces that extend to the projecting ends of the convex V shaped projecting faces that the cutting edge sections 5 form in the plan view, are inclined with respect to the bisector L so as to separate from each other towards the projecting end sides, while they extend parallel with a side ridgeline 2A, positioned on the opposite side about the bisector L with respect to the respective cutting edge sections 5, among a pair of the side ridgelines 2A of the equilateral triangular face 2 that extend in the intersecting direction in the respective corner sections 4. Therefore, when seen respectively from the front and back of the equilateral triangular faces 2 sides, the bisector L of the corner section 4, which is the center line of the aforementioned edge section, passes between the two projecting faces of the pair of cutting edge sections 5, and these projecting faces are formed such that the side ridgelines thereof are symmetric about the bisector L. In the present embodiment, the crossing angle between the bisector L of these corner sections 4 and the bisector M of the respective projecting faces is 30°, which is a half of the crossing angle 60° of the pair of the side ridgelines 2A of the corner section 4 in the present embodiment.

Moreover, the pair of these cutting edge sections 5 is arranged on the bisector L so as to be distanced from each other with a slight gap while being arranged so as to be distanced from the pair of the side ridgelines 2A of the equilateral triangular faces 2 that intersect at the corner section 4, and in the portions where these gaps are present, there is provided a wall face that extends perpendicular to the bisector M of each of the cutting edge sections 5 in the plan view. Therefore, these wall faces intersect with each other in the portions where the gaps are present between the pair of the cutting edge sections 5 on the bisector L of the corner section 4, and the crossing angle of which is 120°, that is twice the crossing angle 60° of the pair of the side ridgelines 2A in the corner section 4 in the present embodiment. The pair of these cutting edge sections 5 is formed so as to not go beyond the extended line N of the pair of the side ridgelines 2A of the equilateral triangular face 2 that extend in the intersecting direction of the corner section 4 in the plan view, as shown in FIG. 6.

In the pair of the cutting edge sections 5 formed in the corner section 4 in this way, on at least two of four of the projecting faces facing the front and back equilateral triangular faces 2 sides, there is formed a thread cutting edge 7 having the projecting face as a rake face 6. In the present embodiment, on the projecting face made by one of the cutting edge sections (the cutting edge section on the right side in FIG. 6) 5 that is alternately positioned on the equilateral triangular face 2 sides of the front and back of the insert main body 1, there is formed a pair of thread cutting edges 7 forming a convex V shape on the side ridgelines of the rake face 6, which is the projecting face. That is to say, the insert main body 1 is front-back invert symmetric with 180° rotational symmetry about the axis as described above. Therefore, when the equilateral triangular face 2 is taken as the front face shown in FIG. 6, on this front face side, the other cutting edge section (the cutting edge section on the left side in FIG. 6) 5 of the pair of the cutting edge sections 5 serves as the one cutting edge section 5 on the equilateral triangular face 2 on the opposite back face side, and the projecting face of the back face side of the other cutting edge section 5 positioned alternately to the projecting face of the one cutting edge section 5 which serves as the rake face 6 on the front face side serves as the rake face 6 of the one cutting edge section 5 on the equilateral triangular face 2 side of the back face, thereby forming the thread cutting edge 7 on the side ridgeline.

The narrow angle of the convex V shape formed by these thread cutting edges 7 in the plan view is set according to the shape of a thread section to be formed in a workpiece, and is approximately 60° in the present embodiment. Therefore, the narrow angle between a pair of side ridgelines 8 of the projecting face of the convex V shape in the plan view formed by the other cutting edge section 5 is also approximately 60°.

Figure 3:
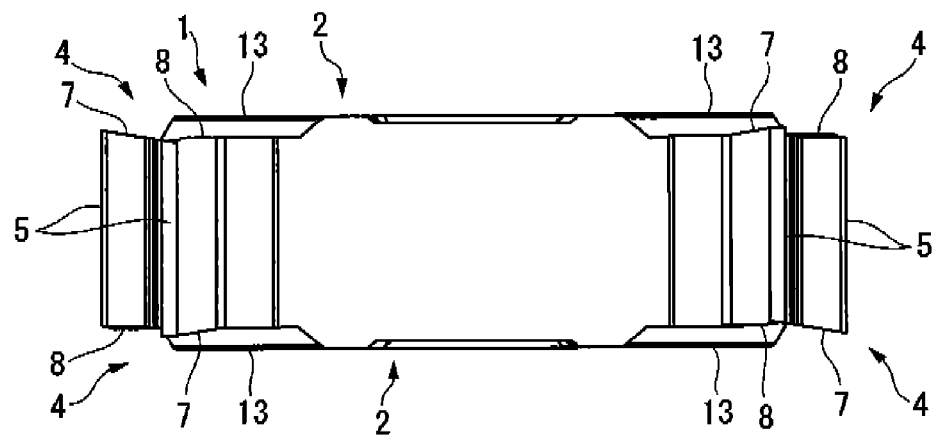
FIG. 3 is a side view seen in the direction of arrow X in FIG. 2.
Figure 4:
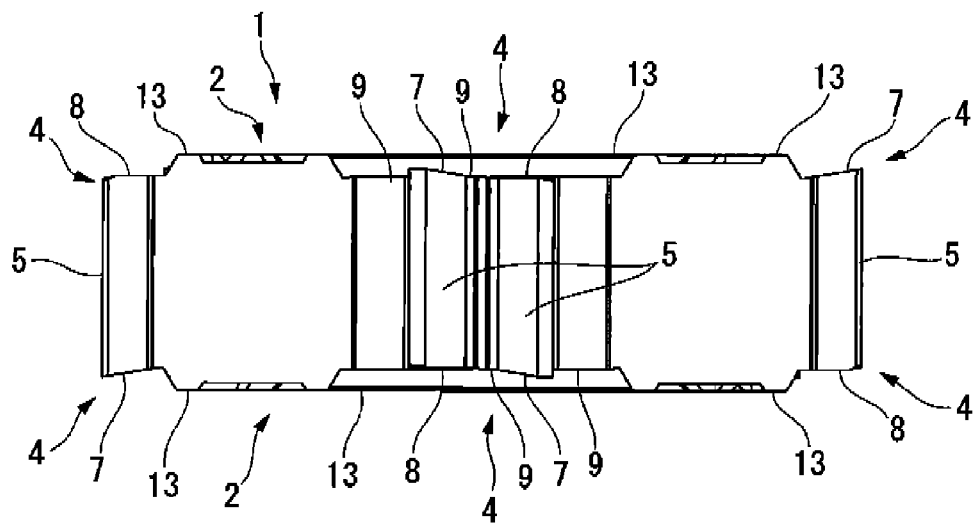
FIG. 4 is a side view seen in the direction of arrow Y in FIG. 2.
Figure 5:
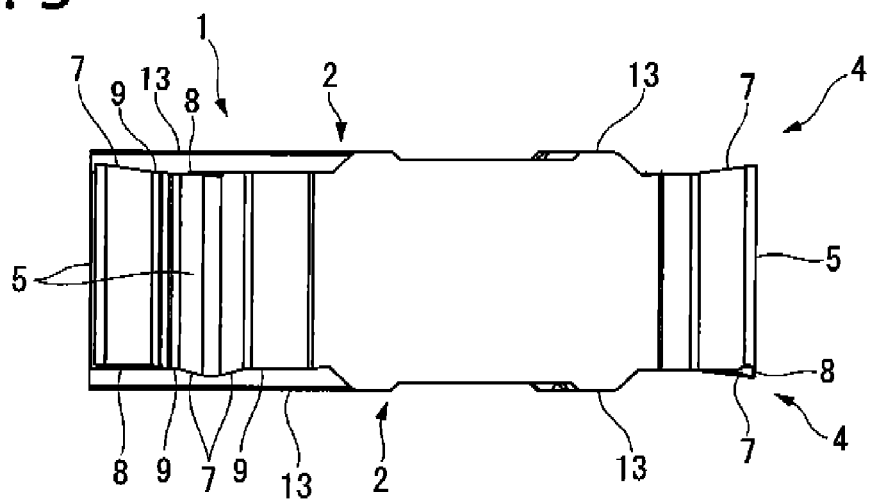
FIG. 5 is a side view seen in the direction of arrow Z in FIG. 2.

Furthermore, the tip end (projecting end of the projecting face) of the above convex V shape where the pair of these thread cutting edges 7 intersect with each other is formed in a convex arc shape, and the pair of these thread cutting edges 7 are inclined towards the base end side (lower side in FIG. 6) of the projecting face from this tip end so as to recede in the thickness direction of the insert in the side view as shown in FIG. 3 to FIG. 5. In the case of such a negative type insert of the present embodiment, in order to give a relief angle to the flank face when thread cutting, the thread cutting edge 7 is arranged so as to be inclined with respect to a plane that includes the rotational axis of a workpiece. Therefore, even in the case of forming a triangular thread of 60° on the workpiece, the narrow angle of the convex V shape formed in the plan view by the thread cutting edges 7 is set to an angle slightly greater than 60°.

Moreover, on the intersecting ridgeline of the wall face that continues to the base end side of this thread cutting edge 7 and the equilateral triangular face 2, there is formed a flat drag 9. Therefore, this flat drag 9 is formed so as to extend perpendicular with respect to the bisector M in the plan view, and it is respectively formed so as to continue to the base end side of the pair of the thread cutting edges 7 in the present embodiment. An edge section in the corner section 4 of the equilateral triangular face 2 which serves as a rake face 10 of this flat drag 9 is inclined so as to gradually recede in the insert thickness direction with respect to the flat drag 9 towards the back end side of this thread cutting edge 7 in the bisector M direction, matching with the incline of the thread cutting edge 7 towards the back end side.

Furthermore, the crossing angle between the bisector L of the corner section 4 and the bisector M of the convex V shape formed by the respective cutting edge sections 5 is 30°, and the narrow angle of the pair of the thread cutting edges 7 on both sides of the bisector M and the narrow angle of the pair of the side ridgelines 8 of the other cutting edge section 5 is approximately 60°. Accordingly, in the plan view, one of the pair of the side ridgelines 8 on the cutting edge 5 side of the projecting face of the convex projecting face formed by the other cutting edge section 5 is formed so as to extend substantially perpendicular with respect to the bisector M of the projecting face formed by the one cutting edge section 5. Therefore, the side ridgeline 8 of this other cutting edge section 5 on the one cutting edge section 5 side is formed so as to extend in parallel with the flat drag 9 that continues to the back end of the thread cutting edge 7 of the one cutting edge section 5, or so as to extend while receding in the bisector M direction as it goes away from the one cutting edge section 5, and there is a gap between the pair of the cutting edge sections 5. As a result, the other cutting edge section 5 recedes in the bisector M direction further than the flat drag 9 of the one cutting edge section 5.

Such a thread cutting insert is attached to an insert attachment seat formed on a tool main body (not shown in the drawing) of a cutting tool such as a detachable insert type thread cutting bite so that one of the pair of the equilateral triangular faces 2 faces the rotational direction of the workpiece, and in one of the corner sections 4 of the one equilateral triangular face 2, the thread cutting edge 7 formed on the one cutting edge section 5 cuts from its tip end towards the surface of the workpiece while it is fed in the insert feeding direction F shown in FIG. 6 perpendicular to the bisector M of this thread cutting edge 7 in the plan view, thereby forming male and female helical threads on the surface of the workpiece.

Figure 8:
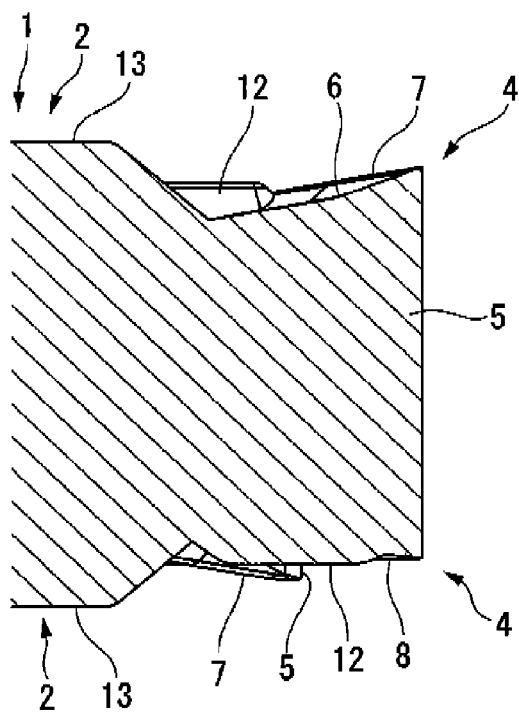
FIG. 8 is a sectional view taken along the line Y-Y in FIG. 6.
Figure 9:
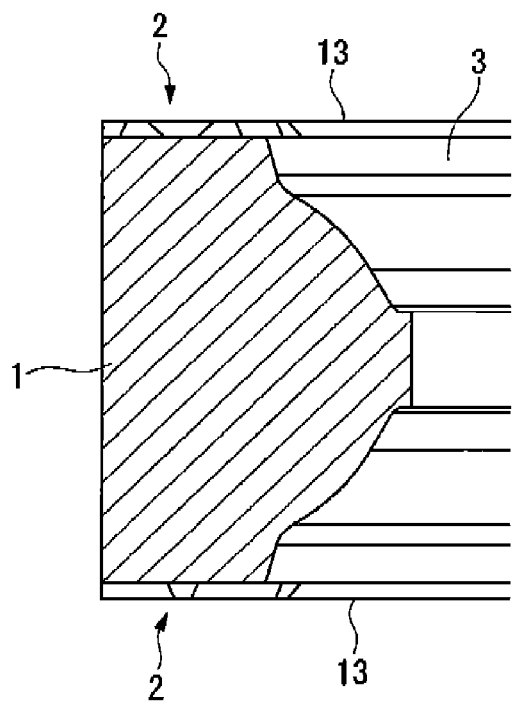
FIG. 9 is a sectional view taken along the line Z-Z in FIG. 6.

The rake face 6 formed on the one cutting edge section 5 is a positive rake face that gradually recedes inward in the insert thickness direction from the side ridgeline on which the thread cutting edge 7 is formed as shown in FIG. 8. Moreover it is a multiple-stepped positive rake face that recedes and inclines in respective steps with certain widths and inclination angles. Here, an inclined face of the first step that continues to the thread cutting edge 7 is a narrow positive land with a moderate inclination angle, an inclined face of the second step has a width and inclination angle greater than those of the first step, and a most inside inclined face of the third step has a moderate inclination angle again.

Furthermore, the inclined faces of the second step, the inclination angles of which are greater are formed so that the inclined face that continues to the thread cutting edge 7 on the back side in the insert feeding direction F has a narrower width and greater inclination angle than those of the inclined face that continues to the thread cutting edge 7 on the insert feeding direction F side. Therefore, the intersecting ridgeline of these inclined faces of the second step is inclined towards the back side in the insert feeding direction F from the bisector M as it gets closer to inside the rake face 6 in the plan view, as shown in FIG. 6.

On the other hand, on the back side of the flat drag 9 of the one cutting edge section 5 in the plan view, there is formed a plurality of first to third chip breakers 11 to 13 (three chip breakers in the present embodiment). These chip breakers 11 to 13 are protrusions that project in the insert thickness direction with respect to the rake face 6, and are provided with breaker wall faces that gradually recede while projecting. Their projection heights become greater in the order of the first to the third chip breakers 11 to 13, and the first and second chip breakers 11 and 12 are positioned more on the thread cutting edge 7 side of the one cutting edge section 5 than the third chip breaker 13.

Furthermore, the first and second chip breakers 11 and 12 among these chip breakers are formed so as to be separated on both sides of the bisector M with a gap so that the first chip breaker 11 is positioned on the back side in the insert feeding direction F with respect to the bisector M of the one cutting edge section 5 and the second chip breaker 12 is positioned on the insert feeding direction F side of this bisector M. Moreover, in this bisector M direction, the positions of the breaker walls of the first and second chip breakers 11 and 12 that face the tip end side of the thread cutting edge 7 are substantially equivalent, or the breaker wall face of the first chip breaker 11 is positioned slightly more on the tip end side of the thread cutting edge 7 than the breaker wall face of the second chip breaker 12.

Furthermore, the first chip breaker 11 is formed like a jetty that has an elliptical truncated cone shape that extends towards the tip end side of the thread cutting edge 7 as it gets closer to the back side in the insert feeding direction F in the plan view. In particular in the present embodiment, the first chip breaker 11 is formed so as to extend in the direction orthogonal to the bisector L and to the thread cutting edge 7 on the back side in the insert feeding direction among the pair of the thread cutting edges 7 in the plan view. Moreover, the breaker wall of the first chip breaker 11 intersects with the inclined faces of the respective steps of the rake face 6 more on the back side than the back end of the thread cutting edge 7. Furthermore it extends more to the rake face 10 of the flat drag 9 on the insert feeding direction back side than the rake face 6. The projecting end face of this first chip breaker 11 is a flat face perpendicular to the insert thickness direction, and it is positioned below the tip end of the thread cutting edge 7 in this insert thickness direction and above the edge section.

Moreover, the second chip breaker 12 is formed in the projecting face formed by the other cutting edge section 5. The breaker wall of the second chip breaker 12 in the plan view extends perpendicular to the bisector M from the insert feeding direction F side of the projecting face of the other cutting edge section 5, intersects with the inclined faces of the first and second steps of the rake face 6 that continues to the thread cutting edge 7 on the insert feeding direction F side, bends towards the bisector L direction of the corner section 4, and extends towards the inside of the rake face 6 so as to substantially orthogonally oppose the direction in which the first chip breaker 11 extends. The projecting end face of the second chip breaker 12 is also a flat face perpendicular to the insert thickness direction, and the height in the insert thickness direction is lower than the tip end of the thread cutting edge 7 and substantially equal to that of the flat drag 9, as with the first chip breaker 11.

Figure 7:
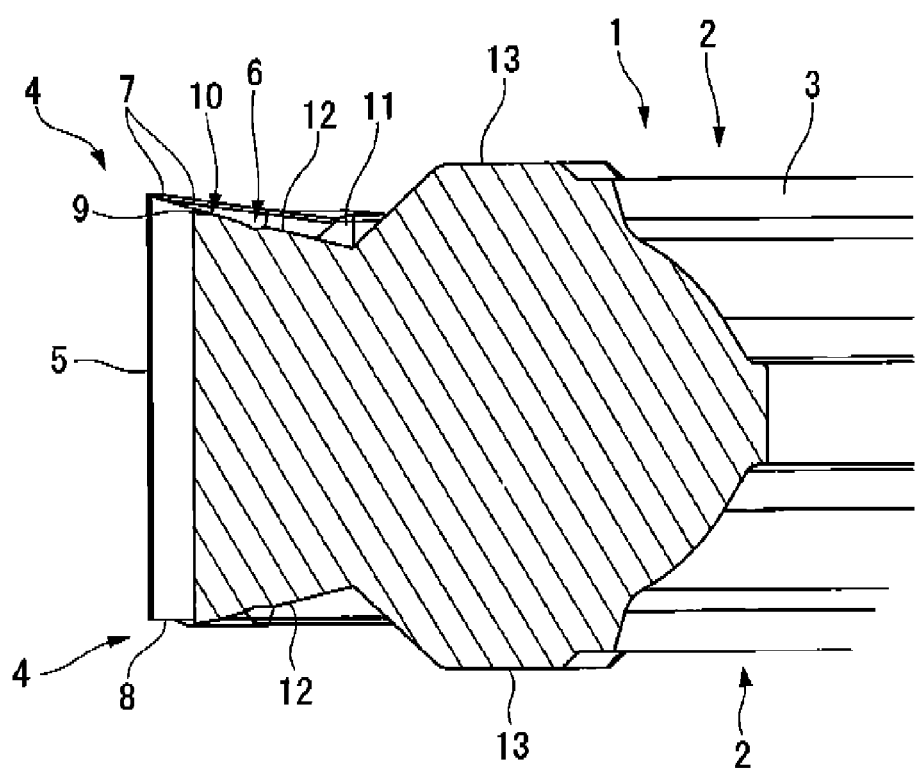
FIG. 7 is a sectional view taken along the line X-X in FIG. 6.

Furthermore, the third chip breaker 13 has a breaker wall that extends substantially parallel with the extending direction of the first chip breaker 11 in the plan view, that is to say, that extends perpendicular to the bisector L, and it is provided so as to extend between the pair of the side ridgelines 2A that intersect in the corner section 4 of the equilateral triangular face 2. The projecting face of this third chip breaker 13 is a flat face perpendicular to the insert thickness direction, however, its height in the insert thickness direction is greater than that of the tip end of the thread cutting edge 7 as shown in FIG. 7 and FIG. 8, and it is the highest in the insert main body 1. The portions of the first and second chip breakers 11 and 12 on the back end side in the bisector M direction of the one cutting edge section 5 are provided so as to continue to the breaker wall face of the third chip breaker 13. Between the first and second chip breakers 11 and 12 on this breaker wall face, there is formed a concave V shaped valley section around the intersecting point of the bisector L and the bisector M of the one cutting edge section 5 in the plan view in the present embodiment.

The inside of the third chip breaker 13 on the equilateral triangular face 2 is a flat face that recedes one step from the third chip breaker in the insert thickness direction, on which there is opened the attachment hole 3. In the present embodiment, an index 14 that indicates any one of the pair of the cutting edge sections 5 formed in each of the corner sections 4 is provided in the vicinity of the corner section 4 of the insert main body 1 so as to cut into the inside edge section of this third chip breaker 13 towards the corner section 4 side. Here, in the present embodiment, this index 14 is formed so as to cut in towards the projecting face side where the thread cutting edge 7 is not formed, among the projecting faces of the pair of the cutting edge sections 5 in each of the equilateral triangular faces 2.

In the thread cutting insert configured in this way, in the common corner section 4 of the pair of the front and back equilateral triangular faces 2, there is formed the pair of the cutting edge sections 5, and at least two projecting faces among the total of four of the projecting faces of the front and back cutting edge sections 5 serve as the rake faces 6 to form the thread cutting edge 7, and particularly in the present embodiment, the thread cutting edges 7 are formed on a total of two projecting faces of the one cutting edge section 5 alternately positioned on the pair of the equilateral triangular faces 2. Accordingly, by reversing the insert main body 1 180° about the axis as mentioned above, it becomes possible to use both of the thread cutting edges 7 of the pair of the cutting edge sections 5. That is to say, the thread cutting edges 7 of twice the number of the corner sections 4 of this equilateral triangular face can be used with use of both of the front and back equilateral triangular faces 2 in one insert main body 1, and thread cutting can be performed efficiently and economically by making effective use of the insert main body 1 made from a super hard alloy or the like.

Moreover, the pair of the cutting edge sections 5 is formed in the corner section 4 of the insert main body 1 in this way and the pair of these cutting edge sections 5 is such that the side ridgelines of the two projecting faces in the plan view seen from the direction facing the front and back equilateral triangular faces 2 are symmetric about the bisector L of the corner section 4, that is the center line of the edge section passing through between these projecting faces. Therefore, by forming the insert main body 1 including these cutting edge sections 5 in a shape that is 180° rotationally symmetric about the axis parallel with the bisector L, even when the insert main body 1 is front-back reversed, the insert main body 1 can be directly re-attached to the insert attachment seat of the tool main body of a detachable insert type cutting tool. Furthermore the side orientation of the thread cutting edge 7 to be used for thread cutting with the insert main body 1 that is re-attached in this way stays the same as that prior to attachment. Accordingly, since the reversed insert main body 1 is attached, there is no need for preparing another tool main body having a different side orientation, only one type of tool main body is needed, and also the number of the thread cutting edges 7 that can be used with one insert main body 1 increases. As a result, management of the insert main body 1 becomes easier and a cost reduction can be achieved.

Furthermore, even if the insert main body 1 is front-back reversed and re-attached to the tool main body, the orientation of the insert main body 1 can be kept the same. Therefore the insert main body 1 can be attached to the tool main body so that with respect to the bisector M of the thread cutting edge 7 of the one cutting edge section 5 to be arranged perpendicular to the insert feeding direction F, among the pair of the side ridgelines 2A of the equilateral triangular face 2 that extend in the direction to intersect with each other in the corner section 4 where the one cutting edge section 5 is formed, the side ridgeline 2A that is in a position, opposite to this one cutting edge section 5, on the other side of the other cutting edge section 5, and faces the insert feeding direction F side when performing thread cutting, extends along the direction parallel with this bisector M, that is, the direction perpendicular to the insert feeding direction F.

Therefore, even in the case where thread cutting is performed on a workpiece in which there is a vertical wall on the insert feeding direction F side, a thread section can be formed to the close vicinity of the vertical wall while preventing to a maximum extent interference between this vertical wall and the side face that continues to the side ridgeline 2A, which is the edge section apart from the corner section 4 of the insert main body 1. As a result, a situation where there is an insufficient length of the thread section formed on the workpiece, or a situation where, for example, a prepared hole needs to be made unnecessarily deeper in order to displace the position of this vertical wall towards the insert feeding direction F side, can be prevented.

In addition, in the present embodiment, since, in the plan view, the pair of these side ridgelines 2A are respectively formed so as to extend in parallel with the bisector M in the one cutting edge section 5 on the side opposite to the other cutting edge section 5, the end of the thread section can be formed in a condition where the insert main body 1 is being brought into a position immediately before the vertical wall while this side ridgeline 2A is always perpendicular to the insert feeding direction F. As a result, the thread section can be formed in a position in the closer vicinity of this vertical wall.

Moreover, in the present embodiment, since, in the plan view, the pair of the cutting edge sections 5 would not go beyond the extended lines N of the pair of the side ridgelines 2A, then when performing thread cutting with the thread cutting edge 7 of the one cutting edge section 5, the other cutting edge section 5 can be prevented from projecting towards the insert feeding direction F side causing interference with the vertical wall, and it becomes possible to more reliably form the thread section to the position immediately before this vertical wall.

On the other hand, in the present embodiment, among the pair of the side ridgelines 8 of the projecting face formed by the other cutting edge section 5 in the plan view, the side ridgeline 8 on the one cutting edge section 5 side is formed so as to extend substantially perpendicular to the bisector M, which is the center line of the projecting face formed by the one cutting edge section 5. Therefore, the other cutting edge section 5 does not project, within the range up to the back end of the thread cutting edge 7 formed in the one cutting edge section 5, beyond this one cutting edge section 5 towards the bisector M direction tip end side. Accordingly, when the thread cutting edge 7 of the one cutting edge section 5 cuts into the surface of a workpiece towards the tip end side of the bisector M of the cutting edge section 5, interference of the tip end side portion of the other cutting edge section 5 with the surface of the workpiece or with the thread formed by the thread cutting edge 7 can be prevented, and a situation where this other cutting edge section 5 is caught on the surface of the workpiece or a situation where the formed thread is damaged by the other cutting edge section 5, can be prevented.

In the present embodiment, the side ridgeline 8 on the cutting edge section 5 side in the other cutting edge section 5 is formed so as to extend perpendicular to the bisector M of this one cutting edge section 5. However, depending on the shape or angle of the thread to be formed, the side ridgeline 8 may be formed so as to extend at an incline while receding in the bisector M direction of this one cutting edge section 5, as the side ridgeline 8 goes away from the one cutting edge section 5. Also in this case, the other cutting edge section 5 cannot project beyond the thread cutting edge 7 of the one cutting edge section 5 in the bisector M direction thereof. As a result, an effect the same as for the case of forming the side ridgeline 8 perpendicular can be achieved.

Moreover, in the present embodiment, the flat drag 9 is provided on the back end of the thread cutting edge 7 in the one cutting edge section 5 so as to be perpendicular to the bisector M, and the top section of the thread formed by the thread cutting edge 7 can be finished with a flat and smooth surface by this flat drag 9. The other cutting edge section 5 is formed so as to recede in the bisector M direction also with respect to the flat drag 9 of the one cutting edge section 5. Therefore, the other cutting edge section 5 does not interfere with the top section of the thread finished by the flat drag 9 in this way. Moreover since the cut depth created by the thread cutting edge 7 of the one cutting edge section 5 is limited to the position of this flat drag 9, interference of the other cutting edge section 5 with the surface of the workpiece prior to completion of thread cutting can be prevented. In the present embodiment, the pair of the cutting edge sections 5 is provided so as to have a gap on both sides of the bisector L in the corner section 4. However, these cutting edge sections 5 may be formed without a gap therebetween so that the thread cutting edge 7 of the one cutting edge section 5 and the side ridgeline 8 of the other cutting edge section 5 that are adjacent to each other intersect with each other on the bisector L, to form the flat drag 9 that continues to the back end of the thread cutting edge 7 on the side ridgeline 8 that intersects with this thread cutting edge 7.

Incidentally, in the pair of the cutting edge sections 5 formed in the corner section 4 of the insert main body 1 in this way, in the case where the thread cutting edges 7 formed on the two projecting faces of the one cutting edge section 5 that are alternately positioned on the front and back equilateral triangular faces 2 sides are used, the side ridgeline 8 of the two projecting faces of the remaining other cutting edge section 5 that are positioned alternately is not directly involved in thread cutting, and it is rather preferable that the other cutting edge section 5 be receded as described above to not interfere with the workpiece. However, in the present embodiment, the chip breaker (second chip breaker) 12 is formed on the projecting face of this other cutting edge section 5, and chips created by the thread cutting edge 7 of the one cutting edge section 5 can be processed by this chip breaker 12.

Furthermore, in the present embodiment, in addition to the second chip breaker 12 formed on the projecting face of this other cutting edge section 5, there are formed the first chip breaker 11 having a projection higher than that of this second chip breaker 12 and the third chip breaker 13 having a projection higher than those of the first and second chip breakers 11 and 12, and the first and second chip breakers 11 and 12 among these are in positions that are more on the tip end side of the thread cutting edge 7 of the one cutting edge section 5 than the third chip breaker 13. Therefore, the chips created by the thread cutting edge 7 first collide with these first and second chip breakers 11 and 12 and thereby get moderately curled, and the outflow of the chips is gradually guided to a predetermined direction due to the difference in the projection heights of the first and second chip breakers 11 and 12. Then the chips collide with the third chip breaker 13 having the highest projection so that they are curled to a predetermined diameter. As a result, it becomes possible to process the chips while reliably guiding them to the required discharging direction.

Moreover, since the rake face 6 is a positive rake face, the cutting resistance of the thread cutting edge 7 can be reduced, thereby achieving smoother thread cutting. In addition, since this positive rake face 6 is a multiple-stepped face, the inclination of which recedes in the insert thickness direction and changes, chips can be curled at the portion where these faces bend. As a result, it becomes possible to promote more reliable chip processing.

Figure 10:
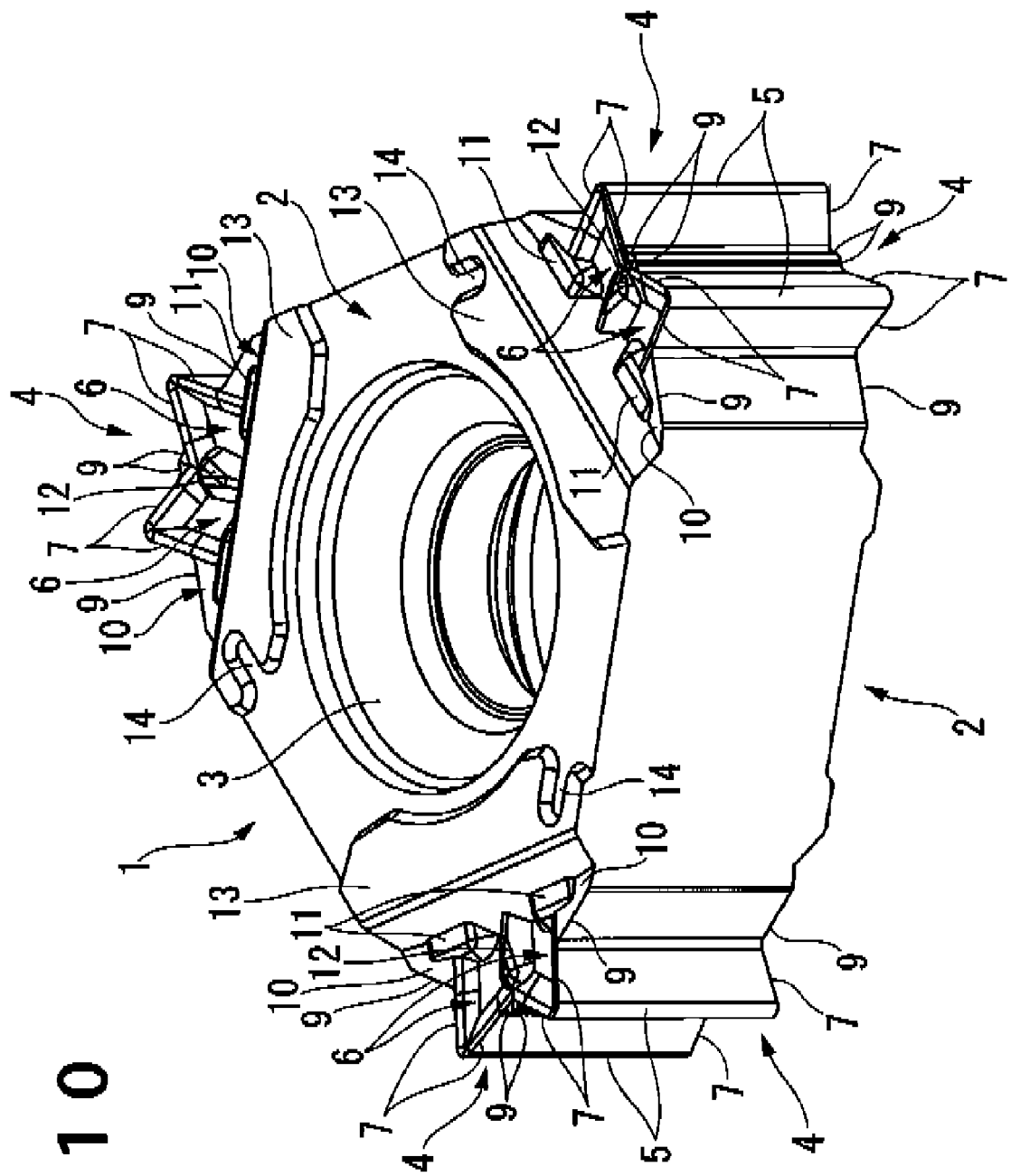
FIG. 10 is a perspective view showing a second embodiment of the present invention.
Figure 11:
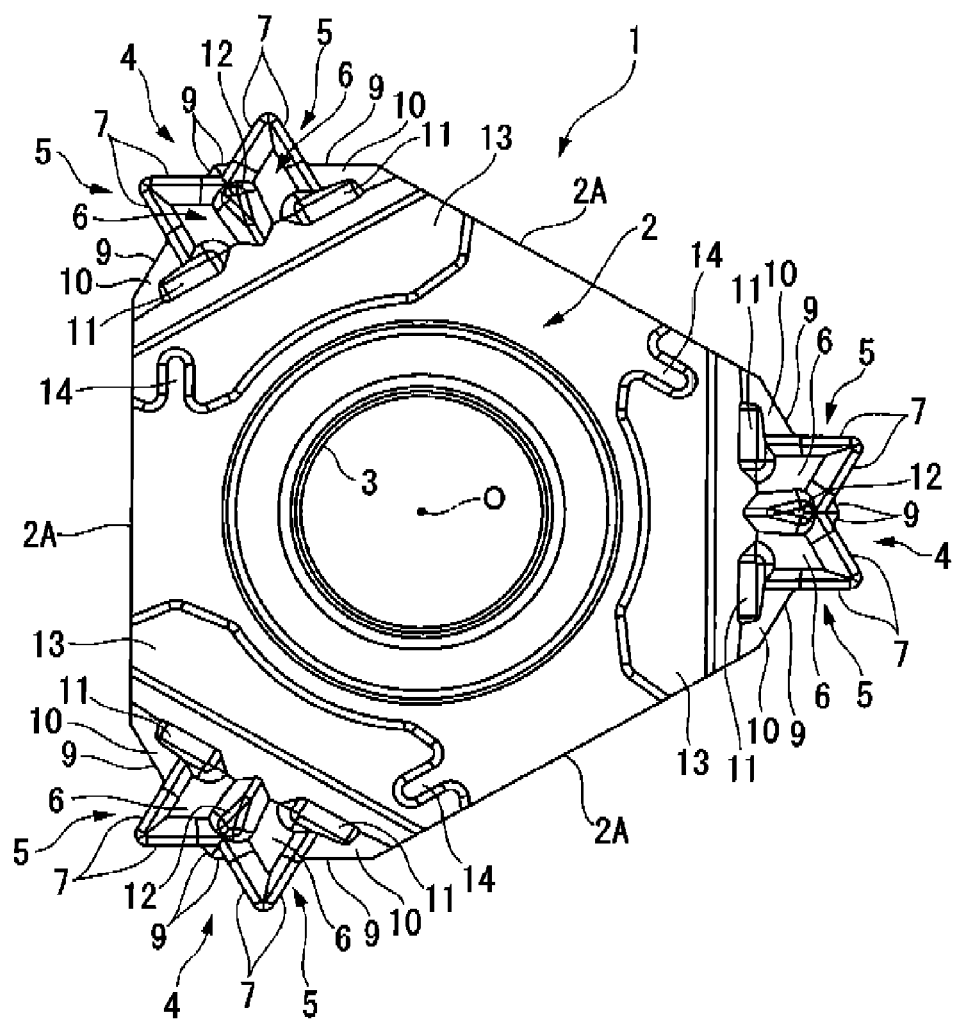
FIG. 11 is a plan view of the embodiment shown in FIG. 10 seen from the direction facing the equilateral triangular face 2 along the axis O.
Figure 1:
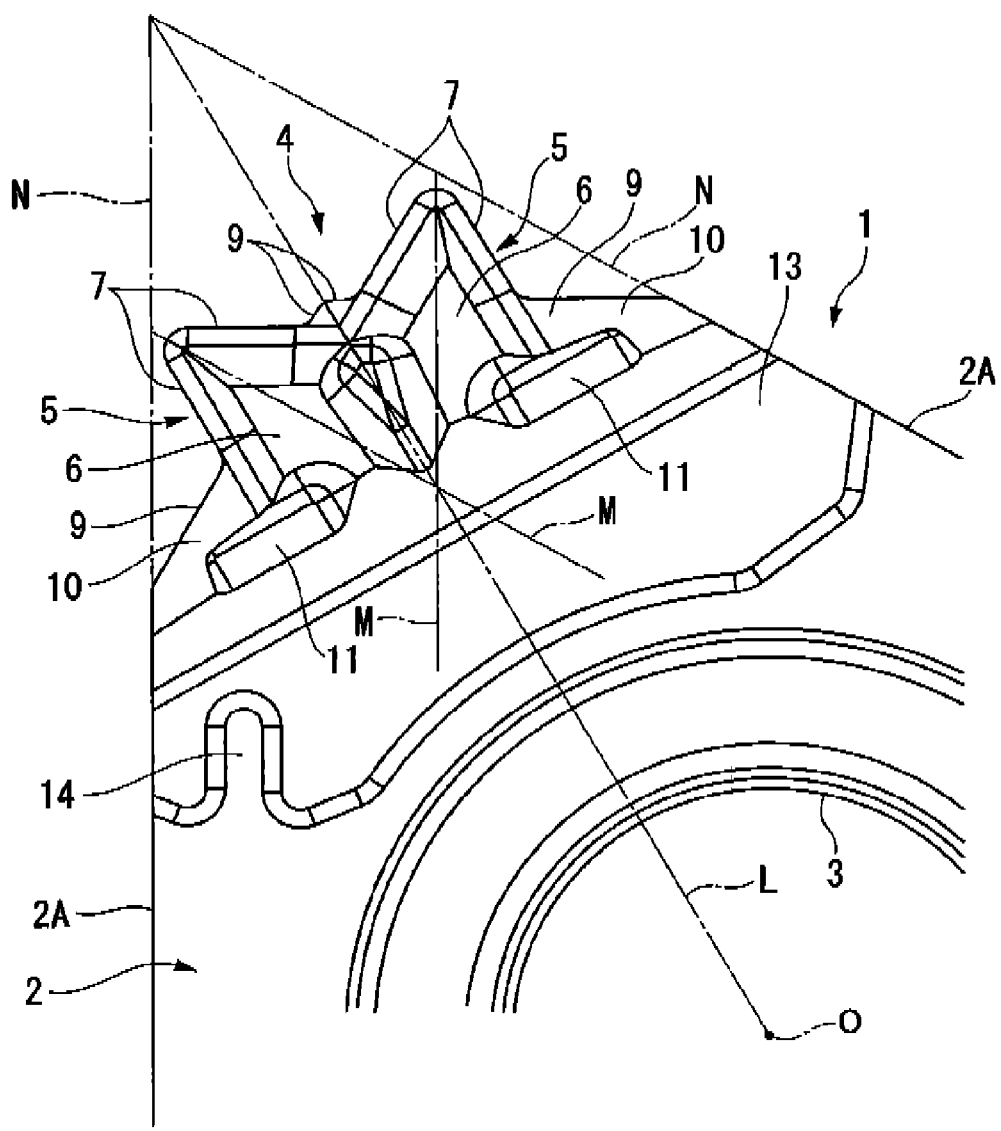

Next, FIG. 10 to FIG. 12 show a second embodiment of the present invention. In the second embodiment, and subsequently described third to eighth embodiments, and modified examples, the same reference symbols are given to components that are commonly used in the first and other embodiments, and descriptions thereof are simplified. Here, this second embodiment is characterized in that a pair of the cutting edge sections 5 formed in the corner section 4, which is a common edge section in the equilateral triangular faces 2 of the front and back faces of the insert main body 1 as with the first embodiment, is formed symmetric with respect to an imaginary plane that includes the bisector L and extends perpendicular to the equilateral triangular face 2 in the insert thickness direction, and on all of four projecting faces of these cutting edge sections 5 that face the equilateral triangular faces 2 sides of the front and back faces, there are formed thread cutting edges 7 with the projecting faces serving as the rake faces 6.

The shape of each of the rake faces 6 is, apart from the second chip breaker 12 being slightly protruding to the first chip breaker 11 side, of a shape the same as that of the rake face 6 in the first embodiment or a shape of the rake face 6 being symmetrically inverted about the imaginary plane.

Therefore, the pair of the cutting edge sections 5 of the present embodiment is such that in the plan view seen from the direction facing the front and back equilateral triangular faces 2, not only the side ridgelines of the two projecting faces, but also the shape of the rake face 6 and the plurality of the first to third chip breakers 11 to 13 are of shapes symmetric about the bisector L of the corner section 4 that is the center line of the edge section passing through between these projecting faces. Furthermore the second chip breaker 12 is formed, on the rake faces 6 of the two projecting faces that respectively face the equilateral triangular faces 2 side, in a projecting shape so as to extend along the bisector L as shown in FIG. 12.

Moreover, the arrangement and crossing angles of the bisector M, which is the center line extending towards the cutting edge section 5 and the projecting end of each of the projecting faces of the cutting edge section 5, and the bisector L and the extended line N of the side ridgeline 2A of the equilateral triangular face 2, are the same as those in the first embodiment. However, the index 14 provided in the vicinity of the corner section 4 on the inside of the cutting edge section 5 extends so as to indicate one of the pair of the cutting edge sections 5 in each of the equilateral triangular faces 2 (the cutting edge section 5 on the left side in FIG. 12), and the positions and orientations of the indexes 14 with respect to the respective corner sections 4 match with each other when the insert main body 1 is 120° rotated about the axis and when the insert main body 1 is reversed about the three axes that are parallel with the bisector L and that pass through the insert thickness direction center.

In the thread cutting insert of the second embodiment configured in this way, as with the first embodiment, the thread cutting edges 7 are formed where the two projecting faces of the one cutting edge section 5, which are alternately positioned on the pair of the equilateral triangular faces 2 sides, serve as the rake faces 6. Therefore, it becomes possible to use these thread cutting edges 7 by reversing the front and back of the insert main body 1, and the thread cutting edges 7 of twice the number of the corner sections 4 of the insert main body 1 can be used. Furthermore, in the present embodiment, since the thread cutting edges 7 are formed on the two remaining projecting faces apart from the above two projecting faces where the projecting faces serve as the rake faces 6, by attaching the insert main body 1 to the tool main body of a detachable insert type cutting tool having a different side orientation, thread cutting can be further performed with use of these thread cutting edges 7.

Therefore, according to the present embodiment, although the side orientation will be different, the thread cutting edges 7 of four times the number of the corner sections 4 can be used, that is to say, all of the side ridgelines on the four projecting faces of the pair of the cutting edge sections 5 can be fully used as the thread cutting edges 7. As a result, the insert main body 1 can be utilized more effectively, and thereby a more efficient and economical thread cutting insert can be provided. In addition, since the side ridgelines of the two projecting faces of the pair of the cutting edge sections 5 are symmetric about the bisector L in the plan view and the thread cutting edges 7 are formed on all of these side ridgelines, the thread cutting edges 7 on the above four projecting faces can all be used for the same thread cutting. Furthermore, even if the same thread cutting edges 7 are formed on all of the four projecting faces in this way, the index 14 is provided so as to indicate the thread cutting edge 7 in either one of the side orientations. As a result, attachment of the thread cutting edge 7 in an incorrect side orientation to the insert main body 1 can be prevented.

In this second embodiment, all of the four projecting faces of the pair of the cutting edge sections 5 in the corner section 4 serve as the rake faces 6, and two of the projecting faces of the one cutting edge section 5 alternately positioned on the pair of the equilateral triangular faces 2 sides serve as the rake faces 6 in the above first embodiment. However, it may be configured such that for example, three out of four of the projecting faces are made to serve as the rake faces 6. That is to say, the arrangement of the rake faces 6 is made as shown in FIG. 6 when seen from one of the equilateral triangular faces 2 sides and the arrangement of the rake faces 6 is made as shown in FIG. 12 when seen from the other equilateral triangular faces 2 sides. Moreover, although there the side orientation will be different, it may be configured such that only two of the projecting faces on the one equilateral triangular faces 2 side are made to serve as the rake faces 6 and the thread cutting edges 7 are not formed on the projecting faces on the other equilateral triangular face 2 side, or that only one set of the front and back projecting faces of the pair of the cutting edge sections 5 are made to serve as the rake faces 6 and the thread cutting edges 7 are not formed on the other set of the front and back projecting faces.

Figure 13:
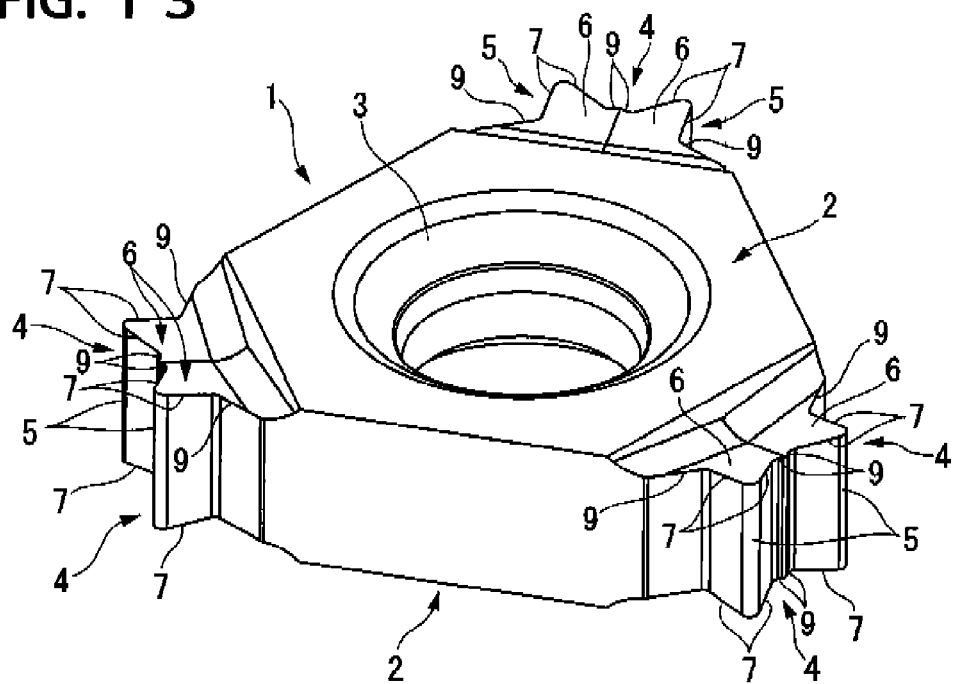
FIG. 13 is a perspective view showing a third embodiment of the present invention.
Figure 14:
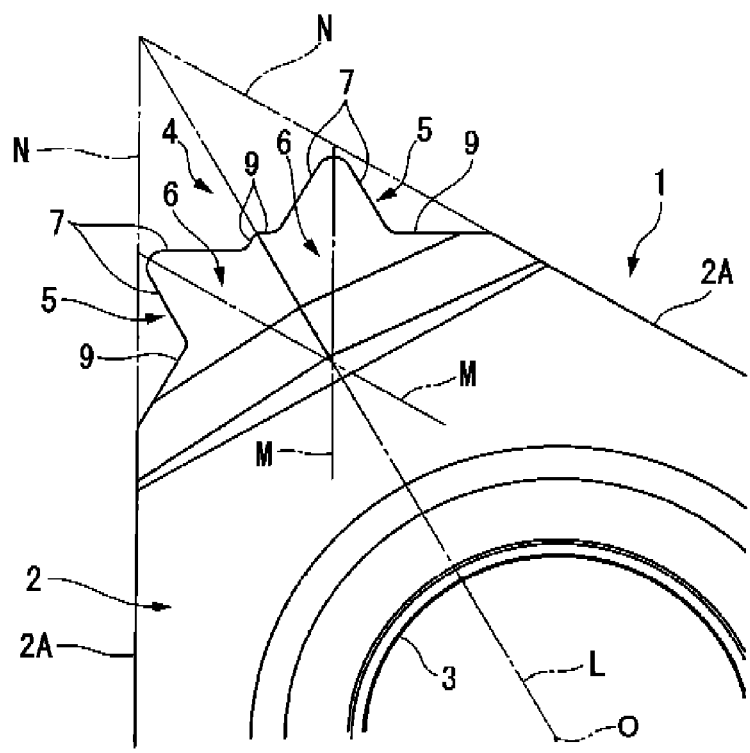
FIG. 14 is an enlarged plan view of the corner section 4 of the insert main body 1 of the embodiment shown in FIG. 13 seen from the direction facing the equilateral triangular face 2 along the axis O.
Figure 15:
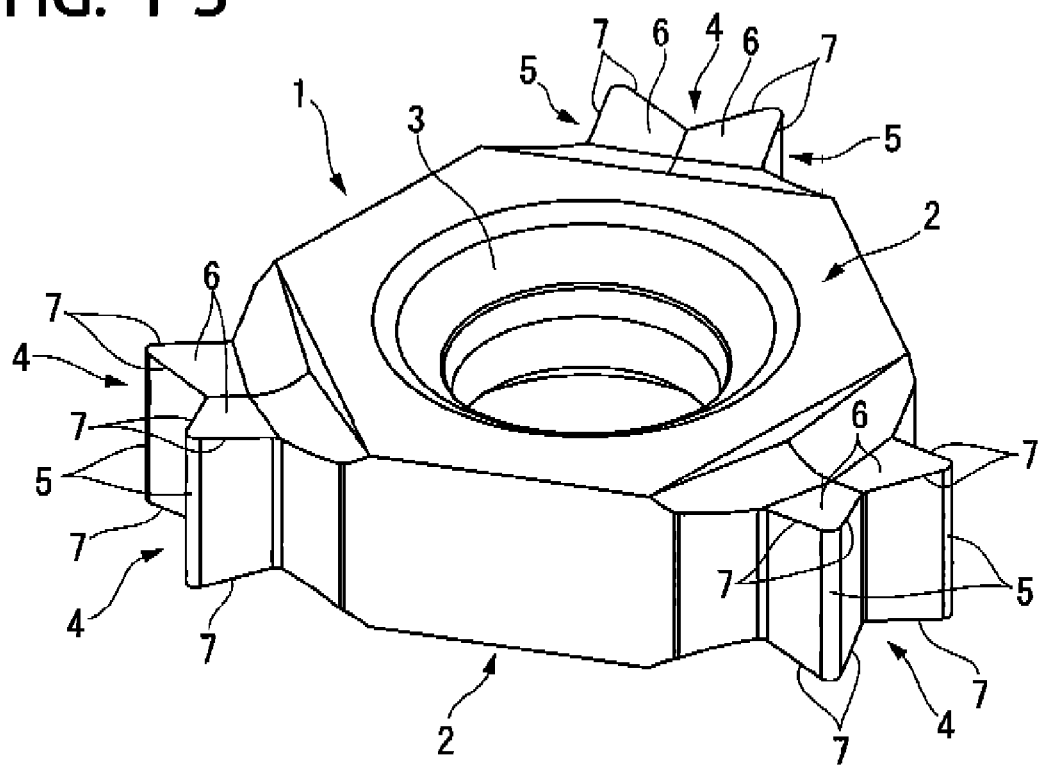
FIG. 15 is a perspective view showing a fourth embodiment of the present invention.
Figure 16:
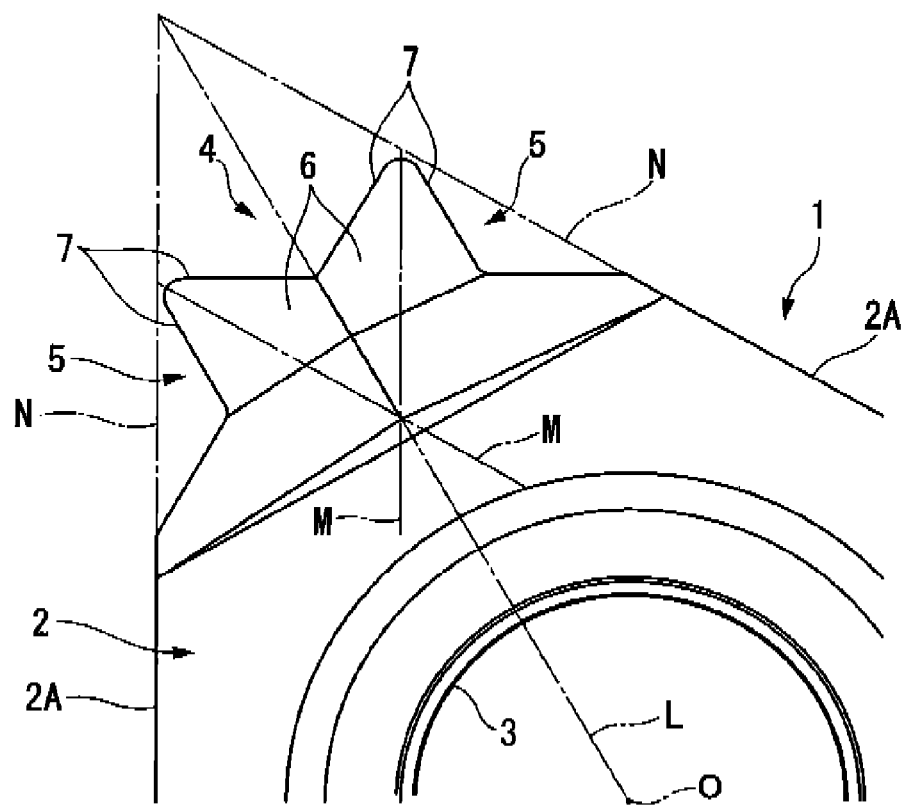
FIG. 16 is an enlarged plan view of the corner section 4 of the insert main body 1 of the embodiment shown in FIG. 15 seen from the direction facing the equilateral triangular face 2 along the axis O.
Figure 17:
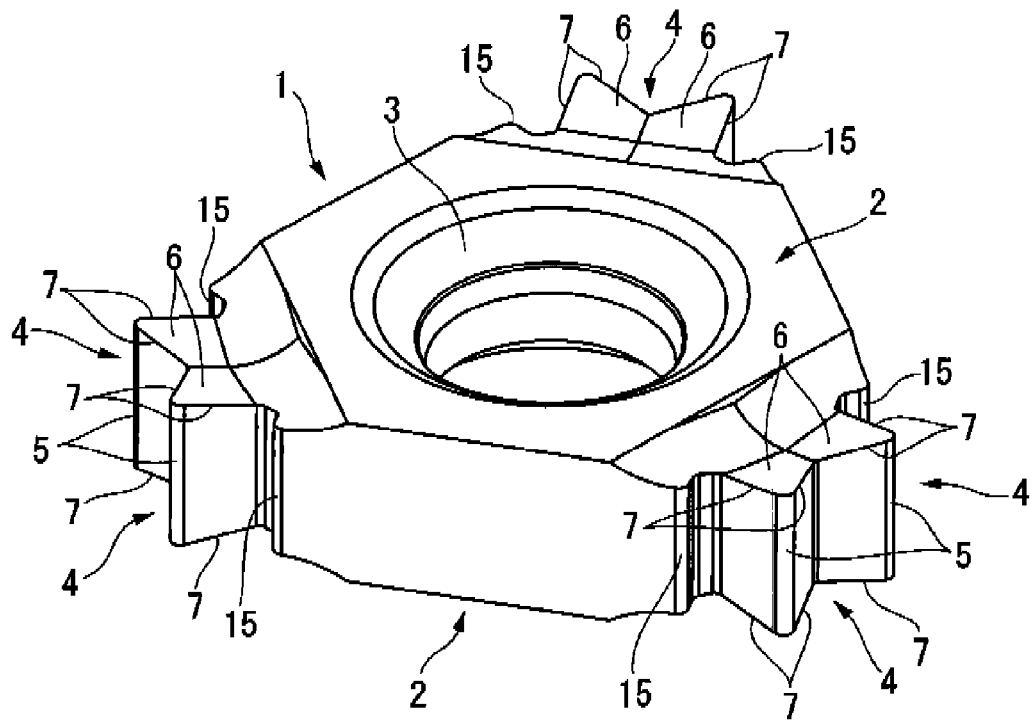
FIG. 17 is a perspective view showing a fifth embodiment of the present invention.
Figure 18:
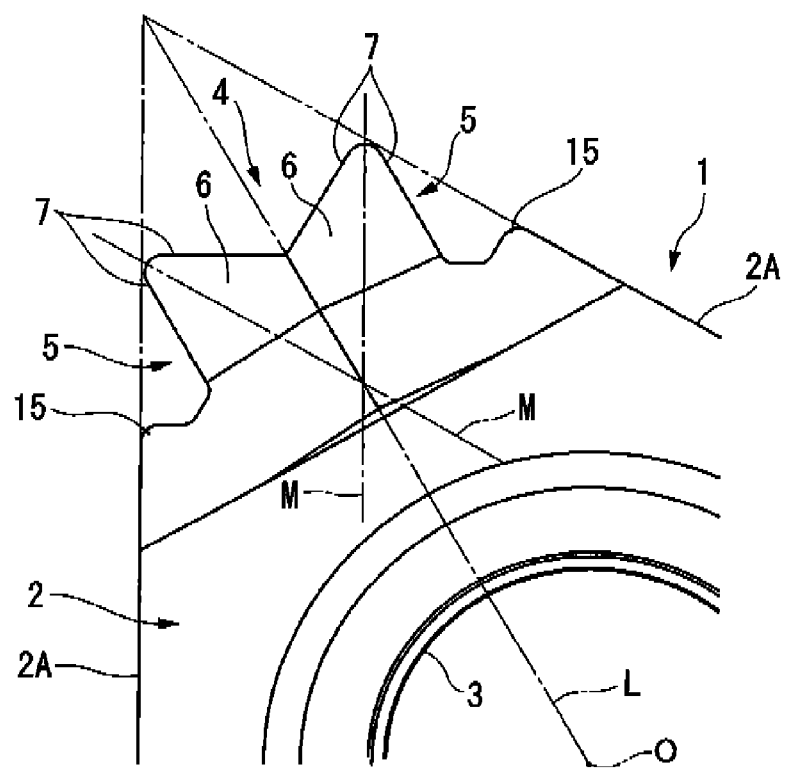
FIG. 18 is an enlarged plan view of the corner section 4 of the insert main body 1 of the embodiment shown in FIG. 17 seen from the direction facing the equilateral triangular face 2 along the axis O.

Moreover, the first to third projecting chip breakers 11 to 13 are formed on the rake faces 6 in these first and second embodiments. However, it may be configured without such projecting chip breakers as described in a third embodiment shown in FIG. 13 and FIG. 14, a fourth embodiment shown in FIG. 15 and FIG. 15, and a fifth embodiment shown in FIG. 17 and FIG. 18. In these third to fifth embodiments, the thread cutting edges 7 are formed where four of the projecting faces of the pair of the cutting edge sections 5 in one corner section 4 serve as the rake faces 6, as with the second embodiment.

Here, these rake faces 6 are inclined at a constant gradient so as to gradually recede from the projecting end of the projecting face in the insert thickness direction along the bisector M that is the center line of the projecting face, and are then formed into the positive rake face 6 that cuts up towards the equilateral triangular face 2 on each side via a concave-curved bottom face. The outline shape of the cutting edge section 5 of the third embodiment is the same as that of the second embodiment in which the rake face 6 is formed in the way mentioned above, and the fourth embodiment is such that the flat drag 9 is removed from the third embodiment and the base end sides of the rake faces that face the same equilateral triangular faces 2 side of the pair of the cutting edge sections 5 are connected. Furthermore, the fifth embodiment is such that, in a position in the corner section 4 of this fourth embodiment distanced from the cutting edge section 5, there is formed a cross-sectionally triangular shaped reinforcing rib 15 along the insert thickness direction so as to not go beyond the above extended line N.

Figure 19:
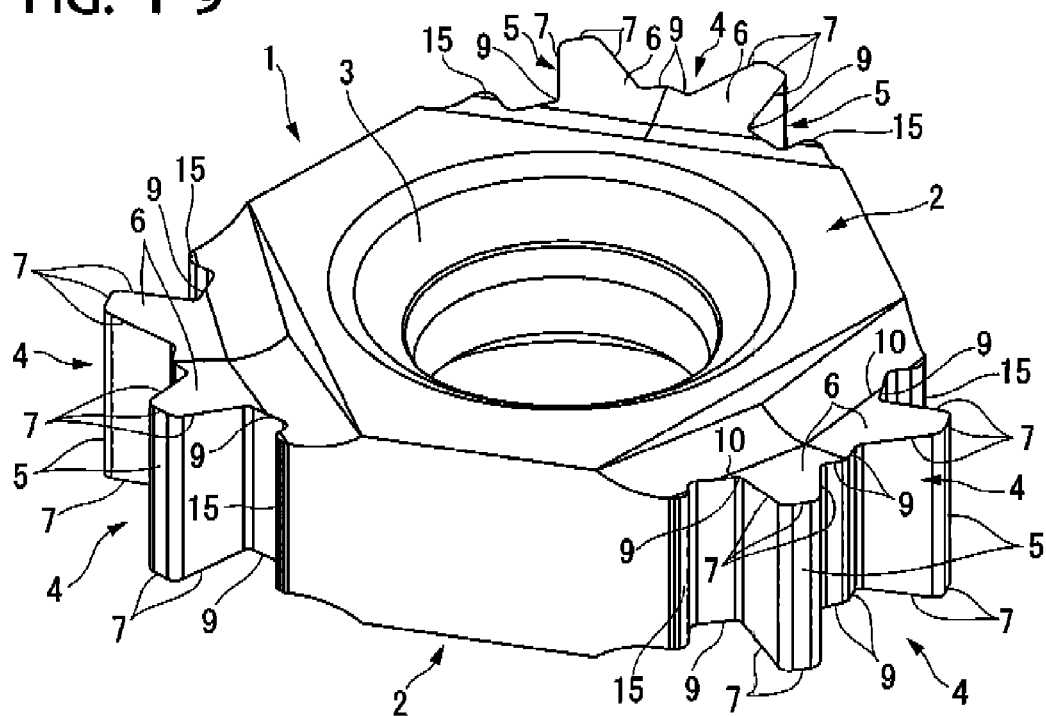
FIG. 19 is a perspective view showing a sixth embodiment of the present invention.
Figure 20:
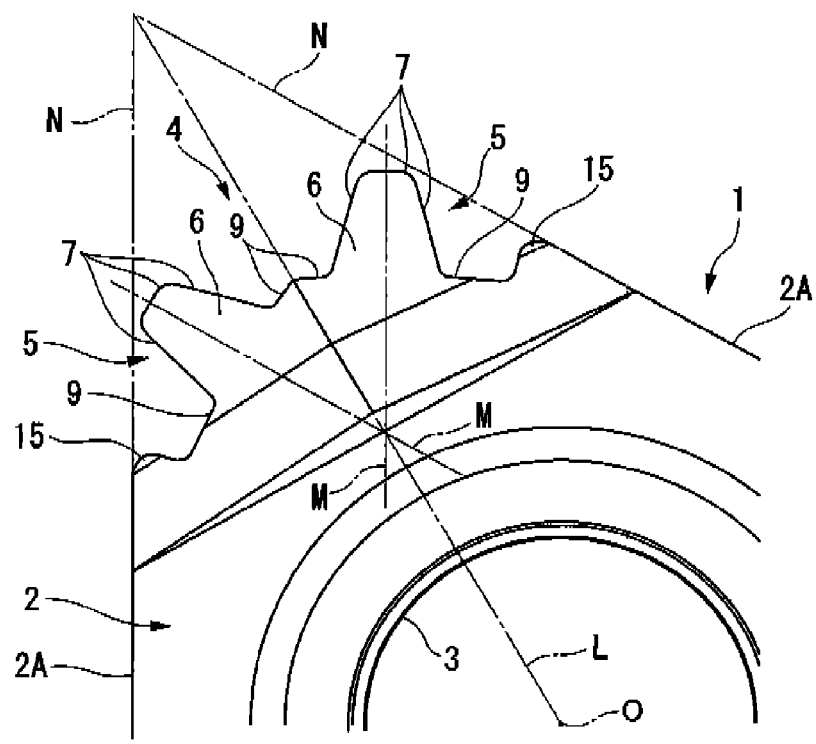
FIG. 20 is an enlarged plan view of the corner section 4 of the insert main body 1 of the embodiment shown in FIG. 19 seen from the direction facing the equilateral triangular face 2 along the axis O.
Figure 21:
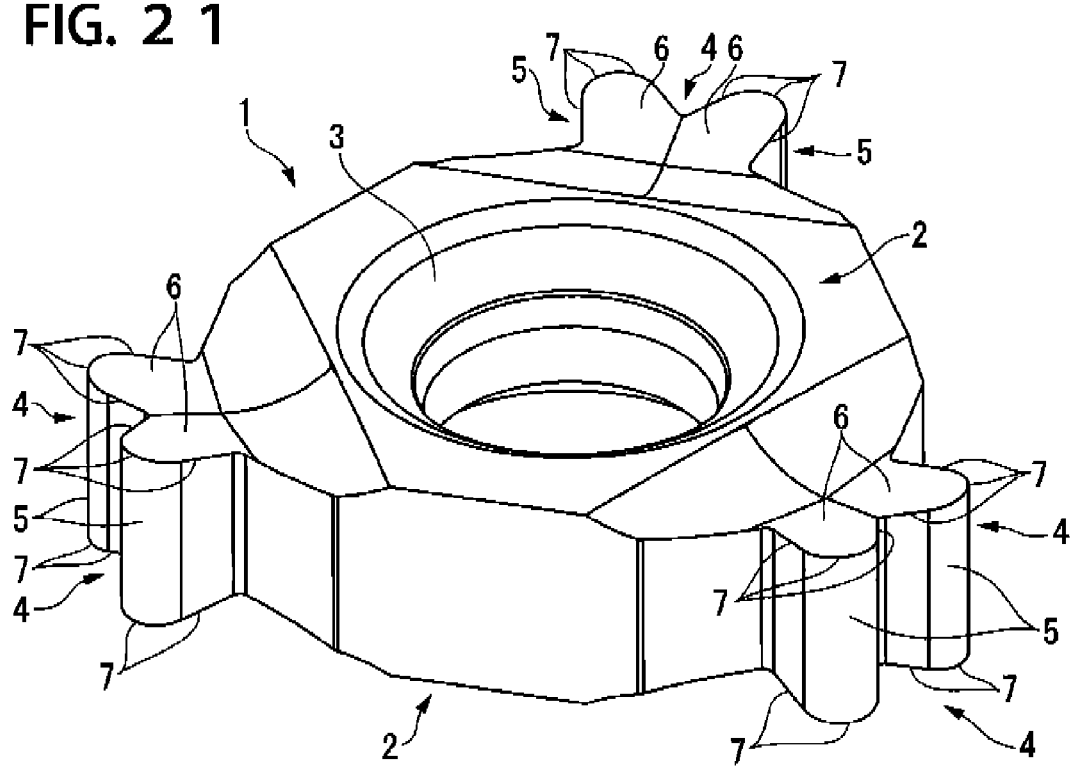
FIG. 21 is a perspective view showing a seventh embodiment of the present invention.
Figure 22:
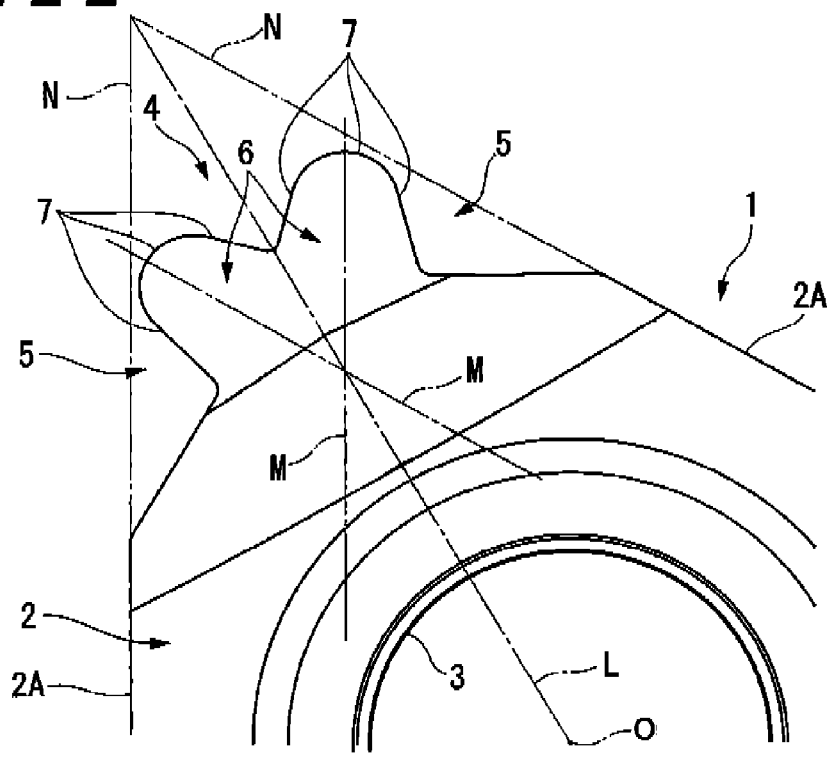
FIG. 22 is an enlarged plan view of the corner section 4 of the insert main body 1 of the embodiment shown in FIG. 21 seen from the direction facing the equilateral triangular face 2 along the axis O.
Figure 23:
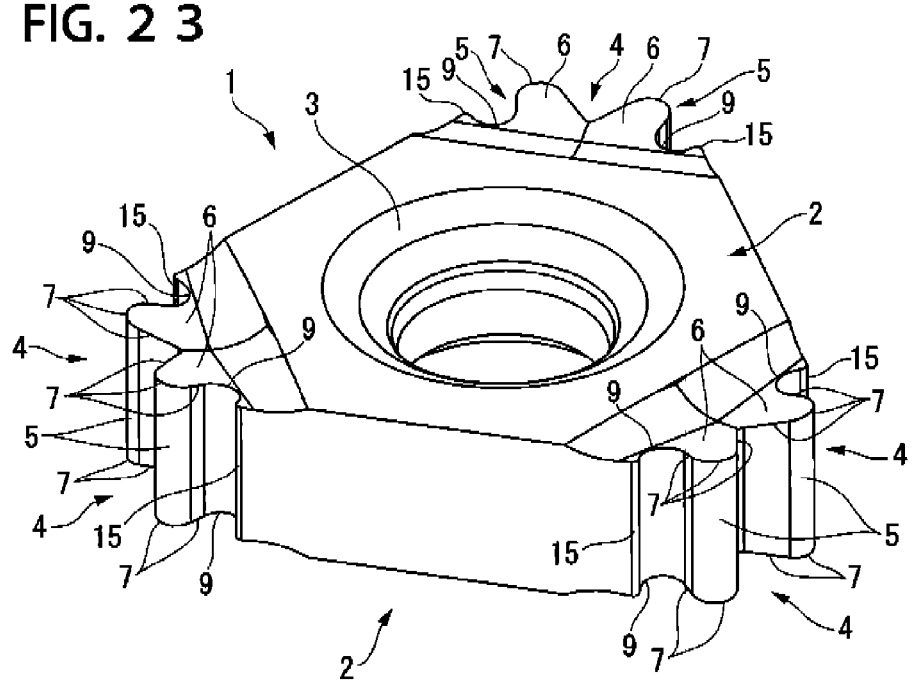
FIG. 23 is a perspective view showing an eighth embodiment of the present invention.
Figure 24:
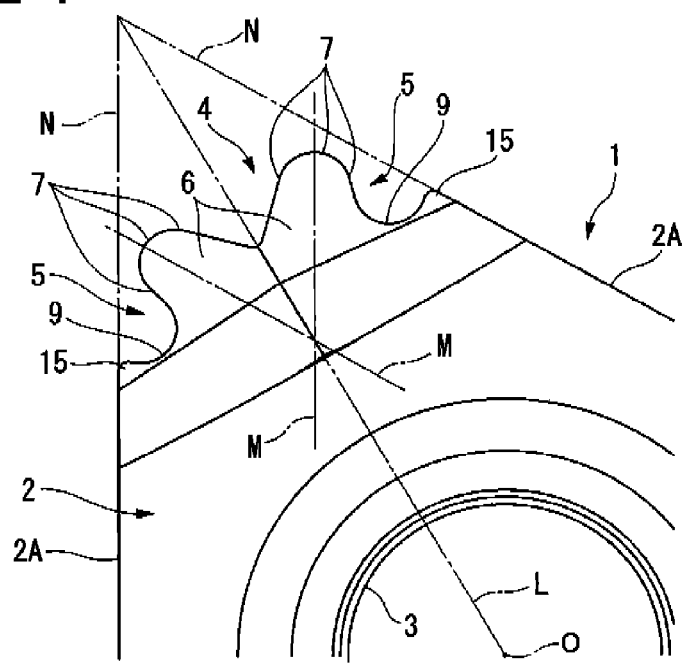
FIG. 24 is an enlarged plan view of the corner section 4 of the insert main body 1 of the embodiment shown in FIG. 23 seen from the direction facing the equilateral triangular face 2 along the axis O.

Moreover, these first to fifth embodiments are such that the projecting face that serves as the rake face 6 is formed in a convex V shape, the width of which becomes narrower towards the projecting end of the projecting face in order to form a triangular thread in a workpiece. However, the present invention may be applied to a thread cutting insert such as in a sixth embodiment shown in FIG. 19 and FIG. 20 for forming a trapezoidal thread in a workpiece, or may be applied to a thread cutting insert such as in a seventh embodiment shown in FIG. 21 and FIG. 22 and in an eighth embodiment shown in FIG. 23 and FIG. 24 for forming a round thread in a workpiece. Even in these six to eighth embodiments, projecting shaped chip breakers are not formed on the rake face 6 and the rake face 6 is a positive rake face 6 as with the third to fifth embodiments.

Here, in the sixth embodiment, the projecting face that faces the equilateral triangular face 2 side of the cutting edge section 5 is formed in an isosceles trapezoid shape, the width of which become narrower towards the projecting end side matching with the shape and the dimension of the trapezoidal thread to be formed. Furthermore the thread cutting edges 7 are formed on the side ridgeline that extends perpendicular to the bisector M on this projecting face side and on the two oblique lines that extend from both of the ends of this side ridgeline towards the base end side of the projecting face, while the flat drag 9 extends in the direction perpendicular to the bisector M from the base end of the thread cutting edge 7 on this oblique line. Moreover, in a position distanced with a gap from the cutting edge sections 5 on both of the ends of the corner section 4, there is formed a reinforcing rib 15 similar to that of the fifth embodiment.

Furthermore, in the seventh and eighth embodiments, the side ridgeline of the projecting end side of the projecting face is of a protruding half arc shape, the center of which is on the bisector M that is the center line of this projecting face, and the side ridgeline on the base end side to both of the ends of this protruding arc is in smooth contact with the protruding arc and is a straight line that inclines while gradually extending the gap distance from the bisector M towards the base end side, and thread cutting edges 6 are formed on these side ridgelines. Therefore, the width of the projecting face also becomes narrower towards the projecting end side. In the eighth embodiment, respectively on both out sides of the pair of the cutting edge sections 5, the flat drags 9 having a protruding half arc shape, the diameter of which is equivalent to that of the protruding arc on the tip end side of the thread cutting edge 6, are formed so as to be in contact with and continue to the base end side of the thread cutting edge 6, and on the further out side of these flat drags 9, there are formed reinforcing ribs 15. On the other hand, such flat drags 9 and reinforcing ribs 15 are not formed in the seventh embodiment.

Figure 25:
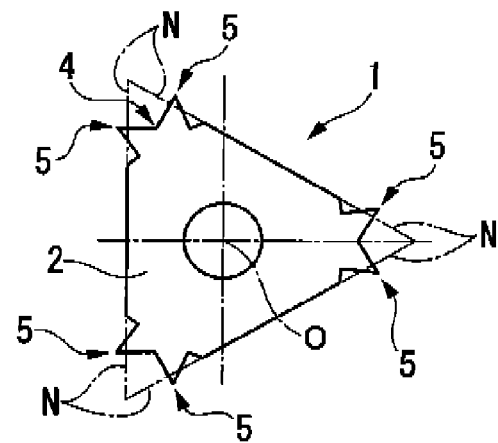
FIG. 25 is a plan view showing a modified example of the first through fifth embodiments.

In the present embodiment, as mentioned above, the pair of the cutting edge sections 5 are such as to not go beyond the extended line N of the pair of the side ridgelines 2A of the equilateral triangular face 2 that extend in directions intersecting in the corner section 4. However, it may be formed such that the cutting edge section 5 goes beyond this extended line N as shown with a modified example schematically shown in FIG. 25. Even in this case, if a concave part for preventing interference with the cutting edge section 5 not to be used for thread cutting is pre-formed in the insert attachment seat formed in a tool main body of a detachable insert type cutting tool for example, then it becomes possible to attach the insert main body 1 to the tool main body the same as that of the thread cutting insert of the respective embodiments.

Figure 26:
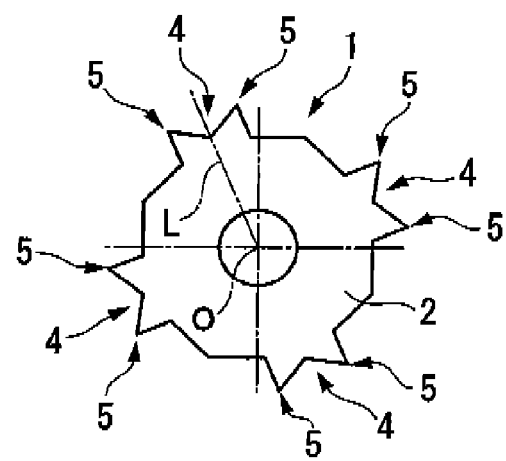
FIG. 26 is a plan view showing another modified example of the first through fifth embodiments.
Figure 27:
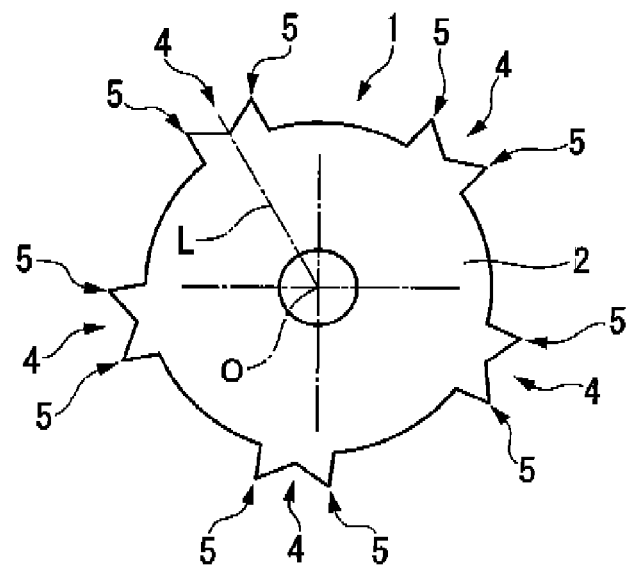
FIG. 27 is a plan view showing still another modified example of the first through fifth embodiments.

Furthermore, in the above respective embodiments, the case of applying the present invention to a thread cutting insert having the insert main body 1 of an equilateral triangular flat plate shape has been described. However, the present invention may be applied to a thread cutting insert having an insert main body 1 in another polygonal flat plate shape such as a quadrangular flat plate shape including a square flat plate shape, and an octagonal flat plate shape including another modified example schematically shown in FIG. 26. Furthermore the pair of the cutting edge sections 5 may be formed with appropriate intervals on the periphery of the disk shaped insert main body 1 as with the modified example schematically shown in FIG. 27.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A thread cutting insert, wherein on a common edge section between front and back faces of an insert main body, there is formed a pair of cutting edge sections that project from said edge section when seen from directions facing said front and back faces, and on at least two of four projecting faces of the pair of cutting edge sections there is formed a thread cutting edge with said projecting face serving as a rake face, with one of the at least two projecting faces with the thread cutting edge being provided adjacent to the front face of the insert body and another one of the at least two projecting faces with the thread cutting edge being provided adjacent to the back face of the insert body, wherein side ridgelines of two of said projecting faces are symmetric about a center line of said edge section that passes between these projecting faces when seen from the directions facing said front and back faces, and wherein the center line extends from a center of an attachment hole provided in the insert main body when seen from the directions facing said front and back faces.

2. The thread cutting insert according to claim 1, wherein in said pair of cutting edge sections, there is formed said thread cutting edge with said projecting face serving as a rake face on two of said projecting faces formed by cutting edge sections that are alternately positioned respectively on said front and back face sides.

3. The thread cutting insert according to claim 2, wherein in said pair of cutting edge sections, there is formed a projecting chip breaker on two of said projecting faces other than those two projecting faces that respectively serve as a rake face.

4. The thread cutting insert according to claim 1, wherein in said pair of cutting edge sections, there is formed said thread cutting edge with said projecting face serving as a rake face on all of four projecting faces that respectively face said front and back face sides.

5. The thread cutting insert according to claim 1, wherein in said pair of cutting edge sections, there is formed a plurality of projecting chip breakers.

6. The thread cutting insert according to claim 5, wherein one of said chip breakers extends between a pair of side ridgelines of a polygonal face that extend in directions intersecting in said corner section.

7. The thread cutting insert according to claim 1, wherein said rake face is a positive rake face that gradually recedes from a side ridgeline of said rake face towards the inside.

8. The thread cutting insert according to claim 7, wherein said positive rake face recedes in steps.

9. The thread cutting insert according to claim 1, wherein in the vicinity of said edge section of said insert main body, there is provided an index that indicates any one of said pair of cutting edge sections.

10. The thread cutting insert according to claim 1, wherein said front and back faces are polygonal faces having said edge section as a corner section, and when seen from a direction facing said front and back faces, a center line that extends to a projecting end of said projecting face formed by one cutting edge section of said pair of cutting edge sections is parallel with a side ridgeline that is positioned on an other side of an other cutting edge section opposite to said one cutting edge section, among a pair of side ridgelines of said polygonal face that extend in directions intersecting in said corner section.

11. The thread cutting insert according to claim 1, wherein said front and back faces are polygonal faces having said edge section as a corner section, and when seen from each of directions facing said front and back faces, said pair of cutting edge sections does not extend beyond an extended line of a pair of side ridgelines of said polygonal face that extend in directions intersecting in said corner section.

12. The thread cutting insert according to claim 1, wherein when seen from a direction facing one of said front and back faces, a side ridgeline on one cutting edge section side of a projecting face formed by an other cutting edge section is perpendicular to a center line of said one cutting edge section that extends to a projecting end of a projecting face formed by said one cutting edge section, or it extends with an incline so as to recede in a direction of said center line as it goes away from said one cutting edge section.

13. The thread cutting insert according to claim 1, wherein when seen from a direction facing said front and back faces, in said pair of cutting edge sections, there are provided: a thread cutting edge with a projecting face formed by one cutting edge section serving as a rake face; and a flat drag that continues to a base end side of said thread cutting edge, and an other cutting edge section recedes from said flat drag in a direction of a center line that extends to a projecting end of a projecting face formed by said one cutting edge section.

14. The thread cutting insert according to claim 1, wherein when seen from a direction facing said front and back faces, said projecting face is a convex V shaped face, a trapezoidal shaped face, or a protruding arc shaped face, the width of which becomes narrower towards a projecting side.

* * * * *